US010992955B2

(12) United States Patent
Braness et al.

(10) Patent No.: US 10,992,955 B2
(45) Date of Patent: Apr. 27, 2021

(54) SYSTEMS AND METHODS FOR PERFORMING ADAPTIVE BITRATE STREAMING

(71) Applicant: DIVX, LLC, San Diego, CA (US)

(72) Inventors: Jason Braness, San Diego, CA (US); Auke Sjoerd van der Schaar, Los Angeles, CA (US); Kourosh Soroushian, San Diego, CA (US)

(73) Assignee: DIVX, LLC, San Diego, CA (US)

(*) Notice: Subject to any disclaimer, the term of this patent is extended or adjusted under 35 U.S.C. 154(b) by 0 days.

(21) Appl. No.: 16/525,073

(22) Filed: Jul. 29, 2019

(65) Prior Publication Data
US 2019/0356928 A1 Nov. 21, 2019

Related U.S. Application Data

(63) Continuation of application No. 16/155,840, filed on Oct. 9, 2018, now Pat. No. 10,368,096, which is a (Continued)

(51) Int. Cl.
*H04N 19/593* (2014.01)
*H04N 21/435* (2011.01)
(Continued)

(52) U.S. Cl.
CPC ......... *H04N 19/593* (2014.11); *G11B 27/005* (2013.01); *G11B 27/11* (2013.01);
(Continued)

(58) Field of Classification Search
None
See application file for complete search history.

(56) References Cited

U.S. PATENT DOCUMENTS 3,609,227 A 9/1971 Kuljian
4,694,491 A 9/1987 Horne et al.
(Continued)

FOREIGN PATENT DOCUMENTS

CA 2237293 A1 7/1997
CA 2749170 A1 7/2010
(Continued)

OTHER PUBLICATIONS

EP11774529 Supplementary European Search Report, completed Jan. 31, 2014, 2 pgs.
(Continued)

*Primary Examiner* — Dave Czekaj
*Assistant Examiner* — Samuel D Fereja
(74) *Attorney, Agent, or Firm* — KPPB LLP

(57) ABSTRACT

Systems and methods for performing trick play functionality using trick play streams during adaptive bitrate streaming in accordance with embodiments of the invention are disclosed. One embodiment includes requesting a video container index from a video container file containing a video stream from a plurality of alternative streams of video; requesting at least one portion of the video stream using at least one entry from the video container index; decoding the at least one portion of the video stream; receiving at least one user instruction to perform a visual search of the media; requesting a trick play container index from a trick play container file containing a trick play stream; requesting at least one frame of video from the at least one trick play stream; and decoding and displaying the at least one frame of video from the trick play stream.

13 Claims, 13 Drawing Sheets

Related U.S. Application Data continuation of application No. 15/881,351, filed on Jan. 26, 2018, now abandoned, which is a continuation of application No. 15/005,990, filed on Jan. 25, 2016, now Pat. No. 9,883,204, which is a continuation of application No. 13/221,794, filed on Aug. 30, 2011, now Pat. No. 9,247,312.

(60) Provisional application No. 61/430,110, filed on Jan. 5, 2011.

(51) Int. Cl.

| | | |
|---|---|---|
| *G11B 27/00* | (2006.01) | |
| *G11B 27/11* | (2006.01) | |
| *G11B 27/32* | (2006.01) | |
| *H04N 21/2387* | (2011.01) | |
| *H04L 29/06* | (2006.01) | |
| *H04N 21/2343* | (2011.01) | |
| *H04N 21/262* | (2011.01) | |
| *H04N 21/2662* | (2011.01) | |
| *H04N 21/442* | (2011.01) | |
| *H04N 21/845* | (2011.01) | |
| *H04N 21/8543* | (2011.01) | |
| *H04N 21/6587* | (2011.01) | |
| *H04N 21/426* | (2011.01) | |
| *H04N 21/44* | (2011.01) | |
| *H04N 19/172* | (2014.01) | |
| *H04N 19/177* | (2014.01) | |
| *H04N 19/40* | (2014.01) | |
| *H04N 21/854* | (2011.01) | |

(52) U.S. Cl.
CPC ........ *G11B 27/322* (2013.01); *H04L 65/4084* (2013.01); *H04L 65/4092* (2013.01); *H04L 65/607* (2013.01); *H04N 19/172* (2014.11); *H04N 19/177* (2014.11); *H04N 19/40* (2014.11); *H04N 21/2387* (2013.01); *H04N 21/23439* (2013.01); *H04N 21/234345* (2013.01); *H04N 21/2662* (2013.01); *H04N 21/26258* (2013.01); *H04N 21/42607* (2013.01); *H04N 21/435* (2013.01); *H04N 21/44004* (2013.01); *H04N 21/44008* (2013.01); *H04N 21/44209* (2013.01); *H04N 21/6587* (2013.01); *H04N 21/8455* (2013.01); *H04N 21/8456* (2013.01); *H04N 21/8543* (2013.01); *H04N 21/85406* (2013.01)

(56) References Cited

U.S. PATENT DOCUMENTS

| | | |
|---|---|---|
| 5,132,992 A | 7/1992 | Yurt et al. |
| 5,341,474 A | 8/1994 | Gelman et al. |
| 5,400,401 A | 3/1995 | Wasilewski et al. |
| 5,477,263 A | 12/1995 | O'Callaghan et al. |
| 5,544,318 A | 8/1996 | Schmitz et al. |
| 5,550,863 A | 8/1996 | Yurt et al. |
| 5,574,785 A | 11/1996 | Ueno et al. |
| 5,600,721 A | 2/1997 | Kitazato |
| 5,614,940 A | 3/1997 | Cobbley et al. |
| 5,630,005 A | 5/1997 | Ort |
| 5,642,338 A | 6/1997 | Fukushima et al. |
| 5,761,417 A | 6/1998 | Henley et al. |
| 5,813,010 A | 9/1998 | Kurano et al. |
| 5,819,160 A | 10/1998 | Foladare et al. |
| 5,838,791 A | 11/1998 | Torii et al. |
| 5,852,664 A | 12/1998 | Iverson et al. |
| 5,854,873 A | 12/1998 | Mori et al. |
| 5,874,986 A | 2/1999 | Gibbon et al. |
| 5,878,135 A | 3/1999 | Blatter et al. |
| 5,892,915 A | 4/1999 | Duso et al. |
| 5,907,658 A | 5/1999 | Murase et al. |
| 5,923,869 A | 7/1999 | Kashiwagi et al. |
| 5,973,679 A | 10/1999 | Abbott et al. |
| 6,002,834 A | 12/1999 | Hirabayashi et al. |
| 6,009,237 A | 12/1999 | Hirabayashi et al. |
| 6,016,381 A | 1/2000 | Taira et al. |
| 6,038,316 A | 3/2000 | Dwork et al. |
| 6,057,832 A | 5/2000 | Lev et al. |
| 6,108,422 A | 8/2000 | Newby et al. |
| 6,151,634 A | 11/2000 | Glaser et al. |
| 6,199,107 B1 | 3/2001 | Dujari |
| 6,266,483 B1 | 7/2001 | Okada et al. |
| 6,282,320 B1 | 8/2001 | Hasegawa et al. |
| 6,320,905 B1 | 11/2001 | Konstantinides |
| 6,347,145 B2 | 2/2002 | Kato et al. |
| 6,351,538 B1 | 2/2002 | Uz |
| 6,373,803 B2 | 4/2002 | Ando et al. |
| 6,415,031 B1 | 7/2002 | Colligan et al. |
| 6,445,877 B1 | 9/2002 | Okada et al. |
| 6,453,115 B1 | 9/2002 | Boyle |
| 6,453,116 B1 | 9/2002 | Ando et al. |
| 6,504,873 B1 | 1/2003 | Vehvilaeinen |
| 6,512,883 B2 | 1/2003 | Shim et al. |
| 6,516,064 B1 | 2/2003 | Osawa et al. |
| 6,535,920 B1 | 3/2003 | Parry et al. |
| 6,578,200 B1 | 6/2003 | Takao et al. |
| 6,594,699 B1 | 7/2003 | Sahai et al. |
| 6,654,933 B1 | 11/2003 | Abbott et al. |
| 6,690,838 B2 | 2/2004 | Zhou |
| 6,714,909 B1 | 3/2004 | Gibbon et al. |
| 6,721,794 B2 | 4/2004 | Taylor et al. |
| 6,724,944 B1 | 4/2004 | Kalevo et al. |
| 6,742,082 B1 | 5/2004 | Lango et al. |
| 6,751,623 B1 | 6/2004 | Basso et al. |
| 6,810,131 B2 | 10/2004 | Nakagawa et al. |
| 6,813,437 B2 | 11/2004 | Ando et al. |
| 6,871,006 B1 | 3/2005 | Oguz et al. |
| 6,912,513 B1 | 6/2005 | Candelore |
| 6,931,543 B1 | 8/2005 | Pang et al. |
| 6,957,350 B1 | 10/2005 | Demos |
| 6,965,646 B1 | 11/2005 | Firestone |
| 6,970,564 B1 | 11/2005 | Kubota et al. |
| 6,983,079 B2 | 1/2006 | Kim |
| 7,006,757 B2 | 2/2006 | Ando et al. |
| 7,020,287 B2 | 3/2006 | Unger |
| 7,023,992 B1 | 4/2006 | Kubota et al. |
| 7,043,021 B2 | 5/2006 | Graunke et al. |
| 7,051,110 B2 | 5/2006 | Hagai et al. |
| 7,054,968 B2 | 5/2006 | Shrader et al. |
| 7,058,177 B1 | 6/2006 | Trimberger et al. |
| 7,073,191 B2 | 7/2006 | Srikantan et al. |
| 7,110,542 B1 | 9/2006 | Tripathy |
| 7,120,250 B2 | 10/2006 | Candelore |
| 7,124,303 B2 | 10/2006 | Candelore et al. |
| 7,139,868 B2 | 11/2006 | Parry et al. |
| 7,143,289 B2 | 11/2006 | Denning et al. |
| 7,167,560 B2 | 1/2007 | Yu |
| 7,188,183 B1 | 3/2007 | Paul et al. |
| 7,203,313 B2 | 4/2007 | England et al. |
| 7,212,726 B2 | 5/2007 | Zetts |
| 7,231,516 B1 | 6/2007 | Sparrell et al. |
| 7,233,669 B2 | 6/2007 | Candelore |
| 7,233,948 B1 | 6/2007 | Shamoon et al. |
| 7,274,861 B2 | 9/2007 | Yahata et al. |
| 7,302,490 B1 | 11/2007 | Gupta et al. |
| 7,315,829 B1 | 1/2008 | Tagawa et al. |
| 7,346,163 B2 | 3/2008 | Pedlow, Jr. et al. |
| 7,349,976 B1 | 3/2008 | Glaser et al. |
| 7,352,956 B1 | 4/2008 | Winter et al. |
| 7,363,647 B1 | 4/2008 | Fakharzadeh |
| 7,376,233 B2 | 5/2008 | Candelore et al. |
| 7,382,879 B1 | 6/2008 | Miller |
| 7,397,853 B2 | 7/2008 | Kwon et al. |
| 7,400,679 B2 | 7/2008 | Kwon et al. |
| 7,406,176 B2 | 7/2008 | Zhu et al. |
| 7,418,132 B2 | 8/2008 | Hoshuyama |
| 7,443,449 B2 | 10/2008 | Momosaki et al. |
| 7,457,415 B2 | 11/2008 | Reitmeier et al. |

(56) References Cited

U.S. PATENT DOCUMENTS

| | | |
|---|---|---|
| 7,460,668 B2 | 12/2008 | Grab et al. |
| 7,499,930 B2 | 3/2009 | Naka et al. |
| 7,539,213 B2 | 5/2009 | Guillemot et al. |
| 7,546,641 B2 | 6/2009 | Robert et al. |
| 7,577,980 B2 | 8/2009 | Kienzle et al. |
| 7,623,759 B2 | 11/2009 | Shimoda |
| 7,624,337 B2 | 11/2009 | Sull et al. |
| 7,627,750 B1 | 12/2009 | Chan |
| 7,627,888 B2 | 12/2009 | Ganesan et al. |
| 7,639,921 B2 | 12/2009 | Seo et al. |
| 7,640,358 B2 | 12/2009 | Deshpande |
| 7,644,172 B2 | 1/2010 | Stewart et al. |
| 7,653,686 B2 | 1/2010 | Yoneda |
| 7,664,262 B2 | 2/2010 | Haruki |
| 7,664,872 B2 | 2/2010 | Osborne et al. |
| 7,676,555 B2 | 3/2010 | Bushee et al. |
| 7,697,686 B2 | 4/2010 | Puiatti et al. |
| 7,702,925 B2 | 4/2010 | Hanko et al. |
| 7,711,052 B2 | 5/2010 | Hannuksela et al. |
| 7,711,647 B2 | 5/2010 | Gunaseelan et al. |
| 7,734,806 B2 | 6/2010 | Park |
| 7,756,270 B2 | 7/2010 | Shimosato et al. |
| 7,756,271 B2 | 7/2010 | Zhu et al. |
| 7,787,622 B2 | 8/2010 | Sprunk |
| 7,797,720 B2 | 9/2010 | Gopalakrishnan et al. |
| 7,840,693 B2 | 11/2010 | Gupta et al. |
| 7,853,980 B2 | 12/2010 | Pedlow, Jr. et al. |
| 7,864,186 B2 | 1/2011 | Robotham et al. |
| 7,873,740 B2 | 1/2011 | Sitaraman et al. |
| 7,877,002 B2 | 1/2011 | Ikeda et al. |
| 7,881,478 B2 | 2/2011 | Derouet |
| 7,885,405 B1 | 2/2011 | Bong |
| 7,895,311 B1 | 2/2011 | Juenger |
| 7,907,833 B2 | 3/2011 | Lee |
| 7,945,143 B2 | 5/2011 | Yahata et al. |
| 7,970,835 B2 | 6/2011 | St Jacques |
| 8,001,471 B2 | 8/2011 | Shaver et al. |
| 8,015,491 B2 | 9/2011 | Shaver et al. |
| 8,073,900 B2 | 12/2011 | Guedalia et al. |
| 8,074,083 B1 | 12/2011 | Lee et al. |
| 8,078,644 B2 | 12/2011 | Hannuksela |
| 8,131,875 B1 | 3/2012 | Chen |
| 8,135,041 B2 | 3/2012 | Ramaswamy |
| 8,160,157 B2 | 4/2012 | Lamy-Bergot et al. |
| 8,169,916 B1 | 5/2012 | Pai et al. |
| 8,170,210 B2 | 5/2012 | Manders et al. |
| 8,213,607 B2 | 7/2012 | Rose et al. |
| 8,213,768 B2 | 7/2012 | Morioka et al. |
| 8,218,439 B2 | 7/2012 | Deshpande |
| 8,243,924 B2 | 8/2012 | Chen et al. |
| 8,286,213 B2 | 10/2012 | Seo |
| 8,286,621 B2 | 10/2012 | Halmone |
| 8,290,157 B2 | 10/2012 | Candelore |
| 8,311,094 B2 | 11/2012 | Kamariotis et al. |
| 8,312,079 B2 | 11/2012 | Newsome et al. |
| 8,327,009 B2 | 12/2012 | Prestenback et al. |
| 8,346,753 B2 | 1/2013 | Hayes |
| 8,365,235 B2 | 1/2013 | Hunt et al. |
| 8,369,421 B2 | 2/2013 | Kadono et al. |
| 8,380,041 B2 | 2/2013 | Barton et al. |
| 8,397,265 B2 | 3/2013 | Henocq et al. |
| 8,401,188 B1 | 3/2013 | Swaminathan |
| 8,464,066 B1 | 6/2013 | Price et al. |
| 8,484,368 B2 | 7/2013 | Robert et al. |
| 8,514,926 B2 | 8/2013 | Ro et al. |
| 8,526,610 B2 | 9/2013 | Shamoon et al. |
| 8,543,842 B2 | 9/2013 | Ginter et al. |
| 8,555,329 B2 | 10/2013 | Frojdh et al. |
| 8,571,993 B2 | 10/2013 | Kocher et al. |
| 8,630,419 B2 | 1/2014 | Mori |
| 8,631,247 B2 | 1/2014 | O'Loughlin et al. |
| 8,650,599 B2 | 2/2014 | Shindo et al. |
| 8,683,066 B2 | 3/2014 | Hurst et al. |
| 8,731,193 B2 | 5/2014 | Farkash et al. |
| 8,731,369 B2 | 5/2014 | Li et al. |
| 8,782,268 B2 | 7/2014 | Pyle et al. |
| 8,804,956 B2 | 8/2014 | Hiriart |
| 8,818,896 B2 | 8/2014 | Candelore |
| 8,819,116 B1 | 8/2014 | Tomay et al. |
| 8,849,950 B2 | 9/2014 | Stockhammer et al. |
| 8,850,205 B2 | 9/2014 | Choi et al. |
| 8,850,498 B1 | 9/2014 | Roach et al. |
| 8,918,533 B2 | 12/2014 | Chen et al. |
| 8,964,977 B2 | 2/2015 | Ziskind et al. |
| 9,015,782 B2 | 4/2015 | Acharya et al. |
| 9,038,116 B1 | 5/2015 | Knox et al. |
| 9,038,121 B2 | 5/2015 | Kienzle et al. |
| 9,111,098 B2 | 8/2015 | Smith et al. |
| 9,191,151 B2 | 11/2015 | Luby et al. |
| 9,201,922 B2 | 12/2015 | Soroushian et al. |
| 9,380,096 B2 | 6/2016 | Luby et al. |
| 9,386,064 B2 | 7/2016 | Luby et al. |
| 9,485,469 B2 | 11/2016 | Kahn et al. |
| 9,615,061 B2 | 4/2017 | Carney et al. |
| 9,628,536 B2 | 4/2017 | Luby et al. |
| 9,667,684 B2 | 5/2017 | Ziskind et al. |
| 9,672,286 B2 | 6/2017 | Soroushian et al. |
| 9,674,254 B2 | 6/2017 | Pare et al. |
| 9,686,332 B1 | 6/2017 | Binns et al. |
| 9,761,274 B2 | 9/2017 | Delpuch et al. |
| 9,967,521 B2 | 5/2018 | Kahn et al. |
| 10,169,094 B2 | 1/2019 | Iyer |
| 10,171,873 B2 | 1/2019 | Krebs |
| 10,225,588 B2 | 3/2019 | Kiefer et al. |
| 10,244,272 B2 | 3/2019 | Kiefer et al. |
| 10,264,255 B2 | 4/2019 | Naletov et al. |
| 10,321,168 B2 | 6/2019 | van der Schaar et al. |
| 10,341,698 B2 | 7/2019 | Kiefer et al. |
| 10,368,096 B2 | 7/2019 | Braness et al. |
| 10,382,785 B2 | 8/2019 | Braness et al. |
| 10,462,537 B2 | 10/2019 | Shivadas et al. |
| 10,805,368 B2 | 10/2020 | van der Schaar et al. |
| 10,893,305 B2 | 1/2021 | van der Schaar et al. |
| 2001/0021276 A1 | 9/2001 | Zhou |
| 2001/0052077 A1 | 12/2001 | Fung et al. |
| 2001/0052127 A1 | 12/2001 | Seo et al. |
| 2002/0048450 A1 | 4/2002 | Zetts |
| 2002/0067432 A1 | 6/2002 | Kondo et al. |
| 2002/0075572 A1 | 6/2002 | Boreczky et al. |
| 2002/0107802 A1 | 8/2002 | Philips |
| 2002/0114330 A1 | 8/2002 | Cheung et al. |
| 2002/0135607 A1 | 9/2002 | Kato et al. |
| 2002/0141503 A1 | 10/2002 | Kobayashi et al. |
| 2002/0154779 A1 | 10/2002 | Asano et al. |
| 2002/0161797 A1 | 10/2002 | Gallo et al. |
| 2002/0164024 A1 | 11/2002 | Arakawa et al. |
| 2002/0169926 A1 | 11/2002 | Pinckney et al. |
| 2002/0169971 A1 | 11/2002 | Asano et al. |
| 2003/0002577 A1 | 1/2003 | Pinder |
| 2003/0043847 A1 | 3/2003 | Haddad |
| 2003/0044080 A1 | 3/2003 | Frishman et al. |
| 2003/0051237 A1 | 3/2003 | Sako et al. |
| 2003/0053541 A1 | 3/2003 | Sun et al. |
| 2003/0063675 A1 | 4/2003 | Kang et al. |
| 2003/0077071 A1 | 4/2003 | Lin et al. |
| 2003/0079222 A1 | 4/2003 | Boykin et al. |
| 2003/0081776 A1 | 5/2003 | Candelore |
| 2003/0135633 A1 | 7/2003 | Dror et al. |
| 2003/0135742 A1 | 7/2003 | Evans |
| 2003/0142594 A1 | 7/2003 | Tsumagari et al. |
| 2003/0152224 A1 | 8/2003 | Candelore et al. |
| 2003/0206717 A1 | 11/2003 | Yogeshwar et al. |
| 2004/0001594 A1 | 1/2004 | Krishnaswamy et al. |
| 2004/0003008 A1 | 1/2004 | Wasilewski et al. |
| 2004/0022391 A1 | 2/2004 | Obrien |
| 2004/0028227 A1 | 2/2004 | Yu |
| 2004/0037421 A1 | 2/2004 | Truman |
| 2004/0047592 A1 | 3/2004 | Seo et al. |
| 2004/0047607 A1 | 3/2004 | Seo et al. |
| 2004/0049690 A1 | 3/2004 | Candelore et al. |
| 2004/0049694 A1 | 3/2004 | Candelore |
| 2004/0073917 A1 | 4/2004 | Pedlow et al. |
| 2004/0076237 A1 | 4/2004 | Kadono et al. |
| 2004/0088557 A1 | 5/2004 | Malcolm et al. |

(56) References Cited

U.S. PATENT DOCUMENTS

| | | |
|---|---|---|
| 2004/0093494 A1 | 5/2004 | Nishimoto et al. |
| 2004/0101059 A1 | 5/2004 | Joch et al. |
| 2004/0101142 A1 | 5/2004 | Nasypny |
| 2004/0107356 A1 | 6/2004 | Shamoon et al. |
| 2004/0213094 A1 | 10/2004 | Suzuki |
| 2004/0243714 A1 | 12/2004 | Wynn et al. |
| 2004/0267952 A1 | 12/2004 | He et al. |
| 2005/0005143 A1 | 1/2005 | Lang et al. |
| 2005/0013494 A1 | 1/2005 | Srinivasan et al. |
| 2005/0015509 A1 | 1/2005 | Sitaraman et al. |
| 2005/0063541 A1 | 3/2005 | Candelore |
| 2005/0066063 A1 | 3/2005 | Grigorovitch et al. |
| 2005/0076232 A1 | 4/2005 | Kawaguchi |
| 2005/0102371 A1 | 5/2005 | Aksu |
| 2005/0120132 A1 | 6/2005 | Hutter |
| 2005/0138655 A1 | 6/2005 | Zimler et al. |
| 2005/0144468 A1 | 6/2005 | Northcutt |
| 2005/0177741 A1 | 8/2005 | Chen et al. |
| 2005/0190911 A1 | 9/2005 | Pare et al. |
| 2005/0192904 A1 | 9/2005 | Candelore |
| 2005/0198364 A1 | 9/2005 | Val et al. |
| 2005/0216752 A1 | 9/2005 | Hofmeyr et al. |
| 2005/0227773 A1 | 10/2005 | Lu et al. |
| 2005/0243912 A1 | 11/2005 | Kwon et al. |
| 2005/0262257 A1 | 11/2005 | Major et al. |
| 2005/0265555 A1 | 12/2005 | Pippuri |
| 2006/0013568 A1 | 1/2006 | Rodriguez |
| 2006/0026654 A1 | 2/2006 | An et al. |
| 2006/0059223 A1 | 3/2006 | Klemets et al. |
| 2006/0093318 A1 | 5/2006 | Cohen et al. |
| 2006/0095472 A1 | 5/2006 | Krikorian et al. |
| 2006/0109856 A1 | 5/2006 | Deshpande |
| 2006/0165163 A1 | 7/2006 | Burazerovic et al. |
| 2006/0168298 A1 | 7/2006 | Aoki et al. |
| 2006/0210245 A1 | 9/2006 | McCrossan et al. |
| 2006/0212370 A1 | 9/2006 | Shear et al. |
| 2006/0218251 A1 | 9/2006 | Tanabe |
| 2006/0235883 A1 | 10/2006 | Krebs |
| 2007/0047645 A1 | 3/2007 | Takashima |
| 2007/0055982 A1 | 3/2007 | Spilo |
| 2007/0067472 A1 | 3/2007 | Maertens et al. |
| 2007/0083467 A1 | 4/2007 | Lindahl et al. |
| 2007/0101271 A1 | 5/2007 | Hua et al. |
| 2007/0101387 A1 | 5/2007 | Hua et al. |
| 2007/0106863 A1 | 5/2007 | Bonwick et al. |
| 2007/0156770 A1 | 7/2007 | Espelien |
| 2007/0157267 A1 | 7/2007 | Lopez-Estrada |
| 2007/0162568 A1 | 7/2007 | Gupta et al. |
| 2007/0162981 A1 | 7/2007 | Morioka et al. |
| 2007/0166000 A1 | 7/2007 | Nallur et al. |
| 2007/0180051 A1 | 8/2007 | Kelly et al. |
| 2007/0201502 A1 | 8/2007 | Abramson |
| 2007/0204003 A1 | 8/2007 | Abramson |
| 2007/0204011 A1 | 8/2007 | Shaver et al. |
| 2007/0204115 A1 | 8/2007 | Abramson |
| 2007/0220118 A1 | 9/2007 | Loyer |
| 2007/0250536 A1 | 10/2007 | Tanaka et al. |
| 2008/0022005 A1 | 1/2008 | Wu et al. |
| 2008/0046925 A1 | 2/2008 | Lee et al. |
| 2008/0086570 A1 | 4/2008 | Dey et al. |
| 2008/0101718 A1 | 5/2008 | Yang et al. |
| 2008/0131078 A1 | 6/2008 | Jeong et al. |
| 2008/0134043 A1 | 6/2008 | Georgis |
| 2008/0137847 A1 | 6/2008 | Candelore et al. |
| 2008/0155615 A1 | 6/2008 | Craner et al. |
| 2008/0160911 A1 | 7/2008 | Chou et al. |
| 2008/0168516 A1 | 7/2008 | Flick et al. |
| 2008/0177793 A1 | 7/2008 | Epstein et al. |
| 2008/0184119 A1 | 7/2008 | Eyal et al. |
| 2008/0229025 A1 | 9/2008 | Plamondon |
| 2008/0313541 A1 | 12/2008 | Shafton et al. |
| 2008/0320100 A1 | 12/2008 | Pantos et al. |
| 2008/0320160 A1 | 12/2008 | Sitaraman et al. |
| 2009/0010429 A1 | 1/2009 | Kim et al. |
| 2009/0010622 A1 | 1/2009 | Yahata et al. |
| 2009/0013195 A1 | 1/2009 | Ochi et al. |
| 2009/0067367 A1 | 3/2009 | Buracchini et al. |
| 2009/0077143 A1 | 3/2009 | Macy, Jr. |
| 2009/0106082 A1 | 4/2009 | Senti et al. |
| 2009/0138570 A1 | 5/2009 | Miura et al. |
| 2009/0150406 A1 | 6/2009 | Giblin |
| 2009/0169001 A1 | 7/2009 | Tighe et al. |
| 2009/0249081 A1 | 10/2009 | Zayas |
| 2009/0282162 A1 | 11/2009 | Mehrotra et al. |
| 2009/0310819 A1 | 12/2009 | Hatano |
| 2010/0005393 A1 | 1/2010 | Tokashiki et al. |
| 2010/0142915 A1 | 6/2010 | Mcdermott et al. |
| 2010/0185854 A1 | 7/2010 | Burns et al. |
| 2010/0198943 A1 | 8/2010 | Harrang et al. |
| 2010/0316126 A1 | 12/2010 | Chen et al. |
| 2011/0010466 A1 | 1/2011 | Fan et al. |
| 2011/0035517 A1 | 2/2011 | Minnick et al. |
| 2011/0058675 A1 | 3/2011 | Brueck et al. |
| 2011/0082914 A1 | 4/2011 | Robert et al. |
| 2011/0083009 A1 | 4/2011 | Shamoon et al. |
| 2011/0103374 A1 | 5/2011 | Lajoie et al. |
| 2011/0145858 A1 | 6/2011 | Philpott et al. |
| 2011/0158470 A1 | 6/2011 | Martin et al. |
| 2011/0170687 A1 | 7/2011 | Hyodo et al. |
| 2011/0173345 A1 | 7/2011 | Knox et al. |
| 2011/0179185 A1 | 7/2011 | Wang et al. |
| 2011/0197261 A1 | 8/2011 | Dong et al. |
| 2011/0238789 A1 | 9/2011 | Luby et al. |
| 2011/0246661 A1 | 10/2011 | Manzari et al. |
| 2011/0276555 A1 | 11/2011 | Fiero |
| 2011/0296048 A1 | 12/2011 | Knox et al. |
| 2011/0314130 A1 | 12/2011 | Strasman |
| 2012/0005312 A1 | 1/2012 | Mcgowan et al. |
| 2012/0042090 A1 | 2/2012 | Chen et al. |
| 2012/0047542 A1 | 2/2012 | Lewis et al. |
| 2012/0110120 A1 | 5/2012 | Willig et al. |
| 2012/0134496 A1 | 5/2012 | Farkash et al. |
| 2012/0147958 A1 | 6/2012 | Ronca et al. |
| 2012/0167132 A1 | 6/2012 | Mathews et al. |
| 2012/0188069 A1 | 7/2012 | Colombo et al. |
| 2012/0311174 A1 | 12/2012 | Bichot et al. |
| 2012/0331167 A1 | 12/2012 | Hunt |
| 2013/0013803 A1 | 1/2013 | Bichot et al. |
| 2013/0080267 A1 | 3/2013 | McGowan |
| 2013/0159633 A1 | 6/2013 | Lilly |
| 2013/0227111 A1 | 8/2013 | Wright et al. |
| 2013/0297602 A1 | 11/2013 | Soroushian et al. |
| 2014/0019592 A1 | 1/2014 | Arana et al. |
| 2014/0114951 A1 | 4/2014 | Sasaki et al. |
| 2014/0140253 A1 | 5/2014 | Lohmar et al. |
| 2014/0149557 A1 | 5/2014 | Lohmar et al. |
| 2015/0019550 A1 | 1/2015 | Maharajh et al. |
| 2015/0043554 A1 | 2/2015 | Meylan et al. |
| 2015/0281310 A1 | 10/2015 | Ziskind et al. |
| 2015/0288530 A1 | 10/2015 | Oyman |
| 2016/0048593 A1 | 2/2016 | Soroushian et al. |
| 2016/0323342 A1 | 11/2016 | Luby et al. |
| 2017/0011055 A1 | 1/2017 | Pitts |
| 2017/0083474 A1 | 3/2017 | Meswani et al. |
| 2017/0223389 A1 | 8/2017 | Soroushian et al. |
| 2017/0238030 A1 | 8/2017 | Ziskind et al. |
| 2018/0046949 A1 | 2/2018 | Kahn et al. |
| 2018/0081548 A1 | 3/2018 | Barzik et al. |
| 2018/0255366 A1 | 9/2018 | Lockett et al. |
| 2018/0285261 A1 | 10/2018 | Mandal et al. |
| 2019/0020907 A1 | 1/2019 | Kiefer et al. |
| 2019/0045220 A1 | 2/2019 | Braness et al. |
| 2019/0045234 A1 | 2/2019 | Kiefer et al. |
| 2019/0158553 A1 | 5/2019 | Van Der Schaar et al. |
| 2019/0297364 A1 | 9/2019 | van der Schaar et al. |
| 2020/0059706 A1 | 2/2020 | Shivadas et al. |

FOREIGN PATENT DOCUMENTS

| | | |
|---|---|---|
| CA | 2749170 C | 6/2016 |
| CN | 1235473 A | 11/1999 |
| CN | 1629939 A | 6/2005 |
| CN | 101252401 A | 8/2008 |
| CN | 102549557 A | 7/2012 |

(56) References Cited

FOREIGN PATENT DOCUMENTS

| | | |
|---|---|---|
| CN | 102549557 B | 9/2015 |
| CN | 105072454 A | 11/2015 |
| EP | 0818111 A1 | 1/1998 |
| EP | 1158799 A1 | 11/2001 |
| EP | 1453319 A1 | 9/2004 |
| EP | 1536646 A1 | 6/2005 |
| EP | 1283640 B1 | 10/2006 |
| EP | 2180664 B1 | 4/2010 |
| EP | 2360923 A1 | 8/2011 |
| EP | 2384475 A1 | 11/2011 |
| EP | 2661875 B1 | 11/2019 |
| EP | 2661696 B1 | 5/2020 |
| EP | 3697096 A1 | 8/2020 |
| EP | 3742740 A1 | 11/2020 |
| GB | 2398210 A | 8/2004 |
| JP | H1175178 A | 3/1999 |
| JP | 2004328218 A | 11/2004 |
| JP | 2005504480 A | 2/2005 |
| JP | 2005173241 A | 6/2005 |
| JP | 2005284041 A | 10/2005 |
| JP | 2005286881 A | 10/2005 |
| JP | 2006521035 A | 9/2006 |
| JP | 2009522887 A | 6/2009 |
| JP | 4516082 B2 | 5/2010 |
| JP | 2012514951 A | 6/2012 |
| JP | 2013513298 A | 4/2013 |
| JP | 5681641 | 1/2015 |
| JP | 2015167357 A | 9/2015 |
| JP | 2018160923 A | 10/2018 |
| JP | 6657313 B2 | 2/2020 |
| JP | 202080551 A | 5/2020 |
| KR | 20040039852 A | 5/2004 |
| KR | 20060030164 A | 4/2006 |
| KR | 20060106250 A | 10/2006 |
| KR | 20060116967 A | 11/2006 |
| KR | 20070005699 A | 1/2007 |
| KR | 20070020727 A | 2/2007 |
| KR | 20090016282 A | 2/2009 |
| KR | 20110133024 A | 12/2011 |
| KR | 101635876 B1 | 7/2016 |
| KR | 10-1988877 B1 | 6/2019 |
| KR | 10-2072839 | 1/2020 |
| KR | 10-2122189 B1 | 6/2020 |
| KR | 10-2195414 B1 | 12/2020 |
| KR | 102191317 B1 | 12/2020 |
| MX | 2011007344 A | 2/2012 |
| RU | 2328040 C2 | 6/2008 |
| WO | 199800973 A1 | 1/1998 |
| WO | 199834405 A1 | 8/1998 |
| WO | 1998047290 | 10/1998 |
| WO | 2000049762 A2 | 8/2000 |
| WO | 2000049763 A1 | 8/2000 |
| WO | 200223315 A2 | 3/2002 |
| WO | 2003028293 | 4/2002 |
| WO | 2002054776 | 7/2002 |
| WO | 2002073437 A1 | 9/2002 |
| WO | 2002087241 A1 | 10/2002 |
| WO | 2003046750 A1 | 6/2003 |
| WO | 2003047262 A2 | 6/2003 |
| WO | 2003061173 A2 | 7/2003 |
| WO | 2004012378 A2 | 2/2004 |
| WO | 2004100158 A1 | 11/2004 |
| WO | 2005008385 A2 | 1/2005 |
| WO | 2005015935 A2 | 2/2005 |
| WO | 2005050373 A2 | 6/2005 |
| WO | 2005057906 A2 | 6/2005 |
| WO | 2005109224 A2 | 11/2005 |
| WO | 2005125214 A2 | 12/2005 |
| WO | 20060012398 A2 | 2/2006 |
| WO | 2007072257 A1 | 6/2007 |
| WO | 2007073347 A1 | 6/2007 |
| WO | 2007093923 A1 | 8/2007 |
| WO | 2007101182 A2 | 9/2007 |
| WO | 2008032908 A1 | 3/2008 |
| WO | 2008090859 A1 | 7/2008 |
| WO | 2009006302 A1 | 1/2009 |
| WO | 2009109976 A2 | 9/2009 |
| WO | 2011086190 A1 | 7/2011 |
| WO | 2011087449 A1 | 7/2011 |
| WO | 2011101371 A1 | 8/2011 |

OTHER PUBLICATIONS

Extended European Search Report for European Application EP10821672, completed Jan. 30, 2014, 3 pgs.
International Preliminary report on Patentability for International Application No. PCT/US2005/025845, report dated Jun. 19, 2007, 6 pgs.
International Preliminary Report on Patentability for International Application PCT/US2010/020372, Completed Oct. 6, 2011, 6 pgs.
International Search Report and Written Opinion for International Application No. PCT/US2010/020372, Completed Feb. 10, 2009, dated Mar. 1, 2010, 8 pgs.
Proceedings of the Second KDD Workshop on Large-Scale Recommender Systems and the Netflix Prize Competition, Las Vegas, Nevada, Aug. 24, 2008, 34 pgs.
Supplementary European Search Report for European Application No. 07758499.3, Report Completed Jan. 25, 2013, 8 pgs.
Wayback Machine, Grooveshark—Features, All Your Music in One Place, printed Aug. 15, 2016 from https://web.archive.org/web/20081013115837/http://www,grooveshark.com/features, 6 pgs.
Written Opinion for International Application No. PCT/US2007/063950 filed Mar. 14, 2007, report completed Mar. 1, 2008; report dated Mar. 19, 2008, 6 pgs.
"DVD-Mpeg differences", printed on Jul. 2, 2009, http://dvd.sourceforge.net/dvdinfo/dvdmpeg.html, 1 page.
"Free music was never so cool before Grooveshark", Wayback Machine, Grooveshark, Startup Meme, May 31, 2008, printed Aug. 15, 2016 from https://web.archive.org/web/20080601173852/http://startupmeme.com/2008/05/31/free-music-was-never-so-wool-before-grooveshark/, 2 pgs.
"HTTP Live Streaming on the Leading Media CDN", Akamai website, retrieved from http://www.akamai.com/html/resources/http-live-streaming.html, 2015, accessed May 11, 2015, 5 pgs.
"Instantly convert songs into tiny URLs with TinySong", Wayback Machine, Startup Memo Technology Blog, printed Aug. 15, 2016 from https://seb.archive.org/web/2008919133853/http://startupmeme.com/instantly-convert-songs-into-tiny-urls-with-tinysong/, 4 pgs.
"Media Delivery Solutions for Streaming Video and Software Delivery", Akamai website, Retrieved from http://www.akamai.com/html/solutions/media-delivery-solutions.html, 2015, Accessed May 11, 2015, 5 pgs.
"Twitpic's Future", Twitpic, Oct. 25, 2014, Retrieved from: https://web.archive.org/web/20150521043642/https://blog.twitpic.com/index.html, 12 pgs.
"What is Fliggo?", Wayback Machine, printed Aug. 15, 2016 from https://web.archive.org/web/20080623065120/http://www.fliggo.com/about, 3 pgs.
Bell et al., "The BellKor 2008 Solution to the Netflix Prize", Netflix Prize, 2008, 21 pgs.
Bocharov et al., "Portable encoding of audio-video objects: The Protected Interoperable File Format (PIFF)", Microsoft Corporation, Sep. 8, 2009, Revised: Mar. 9, 2010, 32 pgs.
Catone, Josh "10 Ways to Share Music on Twitter", Mashable, May 29, 2009, Retrieved from: https://mashable.com/2009/05/29/twitter-music/#vJCdrVzNOOqx, 5 pgs.
Chesler, Oliver "TinySong is like TinyURL for music", wire to the ear, Jun. 30, 2008, printed Aug. 15, 2016 from https://web.archive.org/web/20080907100459/http://www.wiretotheear.com/2008/06/30/tinysongis-like-tinyurl-for-music, 8 pgs.
Lew et al., "Content-Based Multimedia Information Retrieval: State of the Art and Challenges", ACM Transactions on Multimedia Computing, Communications and Applications, Feb. 2006, vol. 2, No. 1, pp. 1-19.
Lomas et al., "Educause Learning Initiative, Collaboration Tools", Educause Learning Initiative, Aug. 2008, ELI Paper 2: 2008, 11 pgs.

(56) References Cited

OTHER PUBLICATIONS

Montes, "Muusic: mashup de servicios web musicales", Ingenieria Tecnica en Informatica de Gestion, Nov. 2008, 87 pgs.
Nelson, Mark "Arithmetic Coding + Statistical Modeling = Data Compression: Part 1—Arithmetic Coding", Doctor Dobb's Journal, Feb. 1991, printed from http://www.dogma.net/markn/articles/arith/part1.htm; printed Jul. 2, 2003, 12 pgs.
Sheu, Tsang-Ling et al., "Dynamic layer adjustments for SVC segments in P2P streaming networks", Computer Symposium (ICS), 2010, 2010 International, Tainan, Taiwan, R.O.C., pp. 793-798, 2010.
Toscher et al., "The BigChaos Solution to the Netflix Prize 2008", Netflix Prize, Nov. 25, 2008, 17 pgs.
Unknown, "MPEG-4 Video Encoder: Based on International Standard ISO/IEC 14496-2", Patni Computer Systems, Ltd., publication date unknown, 15 pgs.
Van Grove, Jennifer "Top 5 Ways to Share Videos on Twitter", Mashable, May 23, 2009, Retrieved from: https://mashable.com/2009/05/23/video-for-twitter/#Jvn9IIYy6qqA, 6 pgs.
Weng, "A Multimedia Socail-Networking Community for Mobile Devices", 2007, 30 pgs.
Fielding et al., "Hypertext Transfer Protocol—HTTP1.1", Network Working Group, RFC 2616, Jun. 1999, 114 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, 4 pgs.
Huang, U.S. Pat. No. 7,729,426, U.S. Appl. No. 11/230,794, filed Sep. 20, 2005, 143 pgs.
Huang et al., "Adaptive MLP post-processing for block-based coded images", IEEE Proceedings—Vision, Image and Signal Processing, vol. 147, No. 5, Oct. 2000, pp. 463-473.
Huang et al., "Architecture Design for Deblocking Filter in H.264/JVT/AVC", 2003 International Conference on Multimedia and Expo., Jul. 6-9, 2003, Baltimore, MD, 4 pgs.
Jain et al., U.S. Appl. No. 61/522,623, filed Aug. 11, 2011, 44 pgs.
Jung et al., "Design and Implementation of an Enhanced Personal Video Recorder for DTV", IEEE Transactions on Consumer Electronics, vol. 47, No. 4, Nov. 2001, 6 pgs.
Kalva, Hari "Delivering MPEG-4 Based Audio-Visual Services", 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Kim et al, "A Deblocking Filter with Two Separate Modes in Block-based Video Coding", IEEE transactions on circuits and systems for video technology, vol. 9, No. 1, 1999, pp. 156-160.
Kim et al., "Tree-Based Group Key Agreement", Feb. 2004, 37 pgs.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
List et al., "Adaptive deblocking filter", IEEE transactions on circuits and systems for video technology, vol. 13, No. 7, Jul. 2003, pp. 614-619.
Massoudi et al., "Overview on Selective Encryption of Image and Video: Challenges and Perspectives", EURASIP Journal on Information Security, Nov. 2008, 18 pgs.
McCanne et al., "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.

Newton et al., "Preserving Privacy by De-identifying Facial Images", Carnegie Mellon University School of Computer Science, Technical Report, CMU-CS-03-119, Mar. 2003, 26 pgs.
O'Brien, U.S. Appl. No. 60/399,846, filed Jul. 30, 2002, 27 pgs.
O'Rourke, "Improved Image Decompression for Reduced Transform Coding Artifacts", IEEE Transactions on Circuits and Systems for Video Technology, vol. 5, No. 6, Dec. 1995, pp. 490-499.
Park et al., "A postprocessing method for reducing quantization effects in low bit-rate moving picture coding", IEEE Transactions on Circuits and Systems for Video Technology, vol. 9, No. 1, Feb. 1999, pp. 161-171.
Richardson, "H.264 and MPEG-4 Video Compression", Wiley, 2003, 306 pgs. (presented in 2 parts).
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP—Standards and Design Principles", Proceedings of the second annual ACM conference on Multimedia, Feb. 2011, pp. 133-145.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Trappe et al., "Key Management and Distribution for Secure Multimedia Multicast", IEEE Transaction on Multimedia, vol. 5, No. 4, Dec. 2003, pp. 544-557.
Van Deursen et al., "On Media Delivery Protocols in the Web", 2010 IEEE International Conference on Multimedia and Expo, Jul. 19-23, 2010, 6 pgs.
Ventura, Guillermo Albaida "Streaming of Multimedia Learning Objects", AG Integrated Communication System, Mar. 2003, 101 pgs.
Waggoner, "Compression for Great Digital Video", 2002, 184 pgs.
Watanabem et al., "MPEG-2 decoder enables DTV trick plays", esearcher System LSI Development Lab, Fujitsu Laboratories Ltd., Kawasaki, Japan, Jun. 2001, 2 pgs.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010, 43 pgs.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.
Server-Side Stream Repackaging (Streaming Video Technologies Panorama, Part 2), Jul. 2011, 15 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
"Apple HTTP Live Streaming specification", Aug. 2017, 60 pgs.
"Data Encryption Decryption using AES Algorithm, Key and Salt with Java Cryptography Extension", Available at https://www.digizol.com/2009/10/java-encrypt-decrypt-jce-salt.html, Oct. 200, 6 pgs.

(56) References Cited

OTHER PUBLICATIONS

"Delivering Live and On-Demand Smooth Streaming", Microsoft Silverlight, 2009, 28 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"Single-Encode Streaming for Multiple Screen Delivery", Telestream Wowza Media Systems, 2009, 6 pgs.
"The MPEG-DASH Standard for Multimedia Streaming Over the Internet", IEEE MultiMedia, vol. 18, No. 4, 2011, 7 pgs.
"Windows Media Player 9", Microsoft, Mar. 23, 2017, 3 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
Alattar et al., A.M. "Improved selective encryption techniques for secure transmission of MPEG video bit-streams", In Proceedings 1999 International Conference on Image Processing (Cat. 99CH36348), vol. 4, IEEE, 1999, pp. 256-260.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Asai et al., "Essential Factors for Full-Interactive VOD Server: Video File System, Disk Scheduling, Network", Proceedings of Globecom '95, Nov. 14-16, 1995, 6 pgs.
Beker et al., "Cipher Systems, The Protection of Communications", 1982, 40 pgs.
Bocharov et al, "Portable Encoding of Audio-Video Objects, The Protected Interoperable File Format (PIFF)", Microsoft Corporation, First Edition Sep. 8, 2009, 30 pgs.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
Candelore, U.S. Appl. No. 60/372,901, filed Apr. 17, 2002, 5 pgs.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, An Approach for Next Generation Mobile Technologies", Thesis, 2010, 84 pgs.
Diamantis et al., "Real Time Video Distribution using Publication through a Database", Proceedings SIBGRAPI'98. International Symposium on Computer Graphics, Image Processing, and Vision (Cat. No. 98EX237), Oct. 1990, 8 pgs.
Dworkin, "Recommendation for Block Cipher Modes of Operation: Methods and Techniques", NIST Special Publication 800-38A, 2001, 66 pgs.
Fang et al., "Real-time deblocking filter for MPEG-4 systems", Asia-Pacific Conference on Circuits and Systems, Oct. 28-31, 2002, Bail, Indonesia, 4 pgs.
Fecheyr-Lippens, "A Review of HTTP Live Streaming", Jan. 2010, 38 pgs.
Extended European Search Report for European Application No. 19211286.0, Search completed Jul. 3, 2020, dated Jul. 13, 2020, 9 pgs.
Extended European Search Report for European Application No. 19211291.0, Search completed Jul. 6, 2020, dated Jul. 14, 2020, 12 pgs.
Extended European Search Report for European Application No. 20172313.7 Search completed Aug. 19, 2020 dated Aug. 27, 2020, 11 pgs.
Information Technology—MPEG Systems Technologies—Part 7: Common Encryption in ISO Base Media File Format Files (ISO/IEC 23001-7), Apr. 2015, 24 pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media Filea Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
Microsoft Corporation, Advanced Systems Format (ASF) Specification, Revision 01.20.03, Dec. 2004, 121 pgs.
MPEG-DASH presentation at Streaming Media West 2011, Nov. 2011, 14 pgs.
Pomelo, LLC Tech Memo, Analysis of Netflix's Security Framework for 'Watch Instantly' Service, Mar.-Apr. 2009, 18 pgs.
"Adobe Flash Video File Format Specification", Aug. 2010, Adobe Systems Incorporated, Version 10.1, 89 pgs.
"Adobe-Fly-Video-File-Format-Spec", Adobe Systems Incorporated, Version 9, 2008, 46 pgs.
"File-format-specification-V9", Adobe Systems Incorporated, Jun. 2007, 298 pgs.
Etsi, "Digital Video Broadcasting (DVB); Implementation guidelines for the use of Video and Audio Coding in Contribution and Primary Distribution Applications based on the Mpeg-2 Transport Stream", ETSI TS 102 154 V1.2.1, May 2004, 73 pgs.
Fahmi et al., "Proxy Servers for Scalable Interactive Video Support", Computer, Sep. 2001, vol. 45, No. 9, pp. 54-60, https://doi.org/10.1109/2.947092.
Fitzek et al., "A Prefetching Protocol for Continuous Media Streaming in Wireless Environments", IEEE Journal on Selected Areas in Communications, Oct. 2001, vol. 19, No. 10, pp. 2015-2028, DOI:10.1109/49.957315.
Ho, "Digital Video Broadcasting Conditional Access Architecture", Report prepared for CS265-Section 2, Fall 2002, Prof Stamp, 7 pgs.
ISMA, "ISMA Encryption and Authentication, Version 1.1, Area/Task Force: DRM", Internet Streaming Media Alliance, Sep. 15, 2006, pp. 1-64.
ITU-T, "Series J: Cable Networks and Transmission of Television, Sound Programme and Other Multimedia Signals", Technical method for ensuring privacy in long-distance international MPEG-2 television transmission conforming to ITU-T J.89, ITU-T Recommendation J.96, Mar. 2001, 34 pgs.
Kabir, "Scalable and Interactive Multimedia Streaming Over the Internet", Thesis, 2005, 207 pgs.
Krikor et al., "Image Encryption Using Dct and Stream Cipher", European Journal of Scientific Research, Jan. 2009, vol. 32, No. 1, pp. 48-58.
Lian et al., "Recent Advances in Multimedia Information System Security", Informatica, Jan. 2009, vol. 33, pp. 3-24.
Lian et al., "Selective Video Encryption Based on Advanced Video Coding", PCM, Nov. 2005, Part II, LNCS 3768, pp. 281-290.

(56) References Cited

OTHER PUBLICATIONS

Lievaart, "Characteristics that differentiate CA Systems", Irdeto access, Nov. 2001, 5 pgs.
Lloyd, "Supporting Trick Mode Playback Universally Across the Digital Television Industry", Thesis, 2005, 111 pgs.
Macaulay et al., "Whitepaper—IP Streaming of MPEG-4: Native RTP vs MPEG-2 Transport Stream", Envivio, Oct. 2005, 12 pgs.
Martin et al., "Privacy Protected Surveillance Using Secure Visual Object Coding", IEEE Transactions on Circuits and Systems for Video Technology, Aug. 2008, vol. 18, No. 8, pp. 1152-1162, DOI: 10.1109/TCSVT.2008.927110.
Meyer et al., "Security mechanisms for Multimedia-Data with the Example MPEG-I-Video", SECMPEG, 1992, 10 pgs.
Molavi et al., "A Security Study of Digital TV Distribution Systems", Thesis, Jun. 2005, 112 pgs.
NCITS/ISO/IEC, "Information Technology—Generic Coding of Moving Pictures and Associated Audio Information: Video (Formerly ANSI/ISO/IEC 13818-22000)", Second edition, Dec. 15, 2000, 220 pgs. (presented in two parts).
Nelson, "The Data Compression Book", M&T Publishing, 1992, 533 pgs., (presented in two parts).
OIPF Open Forum, "OIPF Release 1 Specification, vol. 3, Content Metadata", OIPF, Oct. 8, 2009, vol. 1.1, 47 pgs.
OIPF Open Forum, "OIPF Release 1 Specification, vol. 7—Authentication, Content Protection and Service Protection", OIPF, Oct. 8, 2009, vol. 1.1, 88 pgs.
Open IPTV Forum, "Functional Architecture", Jan. 16, 2008, vol. 1.1, 141 pgs.
Open IPTV Forum, "OIPF Release 1 Specification, vol. 1—Overview", OIPF, Oct. 8, 2009, vol. 1.1, 48 pgs.
Open IPTV Forum, "OIPF Release 1 Specification, vol. 2, Media Formats", OIPF, Oct. 8, 2009, vol. 1.1, 22 pgs.
Park et al., "An Efficient Encryption and Key Management Scheme for Layered Access Control of H.265/Scalable Video Coding", IEICI Trans. Inf. & Syst., May 2009, vol. E92-D, No. 5, pp. 851-858, DOI: 1031587/transinf. E92. D.851.
Park et al., "Combined Scheme of Encryption and Watermarking in H.264/Scalable Video Coding", New Directions in Intelligent Interactive Multimedia, Sci 142, 2008, pp. 351-361.
Qiao et al., "Comparison of MPEG Encryption Algorithms", Comput. & Graphics, 1998, vol. 22, No. 4, pp. 437-448.
Raju et al., "Fast and Secure Real-Time Video Encryption", Sixth Indian Conference on Computer Vision, Graphics & Image Processing, Jan. 2009, pp. 257-264, doi:10.1109/ACVGIP.2008.100.
Senoh et al., "DRM Renewability & Interoperability", IEEE Xplore, Conference: Consumer Communications and Networking Conference, 2004, Feb. 2004, pp. 424-429, DOI: 10.1109/CCNC.2004. 1286899 Conference: Consumer Communications and Networking Conference, 2004. CCNC 2004. First IEEE.
Shojania et al., "Experiences with MPEG-4 Multimedia Streaming", CiteSeer, Jan. 2001, 3 pgs., DOI: 10.1145/500141.500221.
Symes, "Video Compression Demystified", McGraw-Hill, 2001, 353 pgs., (presented in two parts).
Taymans et al., "GStreamer Application Development Manual (1.6.0)", 2007, 159 pgs.

Thomas et al., "A Novel Secure H.264 Transcoder Using Selective Encryption", Proceedings in International Conference on Image Processing, Jan. 2007, vol. 4, pp. IV-85-IV-88, DOI: 10.1109/ICIP. 2007.4379960.
Tosun et al., "Efficient multi-layer coding and encryption of MPEG video streams", 2000 IEEE International Conference on Multimedia and Expo. ICME2000. Proceedings. Latest Advances in the Fast Changing World of Multimedia (Cat. No.00TH8532), Jul. 30-Aug. 2, 2000, pp. 119-122, DOI: 10.1109/1CME.2000.869559.
Um, "Selective Video Encryption of Distributed Video Coded Bitstreams and Multicast Security over Wireless Networks", Thesis, Aug. 2006, 142 pgs.
Wang, "Lightweight Encryption in Multimedia", Thesis, Jun. 2005, 184 pgs.
Wong, "Web Client Programming with Perl", 1997, printed Jan. 8, 2021 from: https://www.oreilly.com/openbook-webclientch03.html, 31 pgs.
Wu, "A Fast Mpeg Encryption Algorithm and Implementation of Aes on Cam", Thesis, Oct. 6, 2003, 91 pgs.
Yuksel, "Partial Encryption of Video for Communication and Storage", Thesis, Sep. 2003, 78 pgs.
International Standard, Information technology—Generic coding of moving pictures and associated audio information: Systems, ISO/IEC 13818-1:2000(E), Dec. 1, 2000 174 pgs.
"Broadcom BCM7413 Product Brief", Dec. 11, 2008, 2 pgs.
"Common Interface Specification for Conditional Access and other Digital Video Broadcasting Decoder Applications", European Standard, EN 50221, Feb. 1997, 86 pgs.
"Server 'Trick Play' support for MPEG-2 Transport Stream Files", www.live555.com/liveMedia/transport-stream-trick-play.html, 2006, Dec. 31, 2020, 1 pg.
"The LIVE555 Media Server", www.live555.com/mediaServer/#about, 2006, printed Dec. 31, 2020, 3 pgs.
Adb, "Adb-3800W Datasheet", 2007, 2 pgs.
Agi et al., "An Empirical Study of Secure MPEG Video Transmissions", IEEE, Mar. 1996, 8 pgs., DOI: 10.1109/NDSS.1996.492420.
Ahmed et al., "An Efficient Chaos-Based Feedback Stream Cipher (ECBFSC) for Image Encryption and Decryption", Informatica, Mar. 2007, vol. 31, No. 1, pp. 121-129.
Arachchi et al., "Adaptation-aware encryption of scalable H.264/AVC for content security", Signal Processing: Image Communication, Jul. 2009, vol. 24, pp. 468-483, doi:10.1016/j.image.2009.02. 004.
Conklin et al., "Video coding for streaming media delivery on the Internet", IEEE Transactions on Circuits and Systems for Video Technology, Mar. 2001, vol. 11, No. 3, pp. 269-281.
Deshpande et al., "Scalable Streaming of JPEG2000 Images Using Hypertext Transfer Protocol", Multimedia '01: Proceedings of the Ninth ACM International Conference on Multimedia, Oct. 2001, pp. 372-381. https://doi.org/10.1145/500141.500197.
Entone, "Amulet High Definition IP Television Receiver User's Guide", 2008, 28 pgs.
Entone, "Hydra HD IP Video Gateway", 2008, 2 pgs.
Etsi, "Digital Video Broadcasting (DVB) Support for use of scrambling and Conditional Access (CA) within digital broadcasting systems", Oct. 1996, 13 pgs.

SYSTEMS AND METHODS FOR PERFORMING ADAPTIVE BITRATE STREAMING

CROSS REFERENCE TO RELATED APPLICATIONS

The current application is a continuation of U.S. patent application Ser. No. 16/155,840 entitled "Adaptive Streaming Systems and Methods for Performing Trick Play" to Braness et al., filed Oct. 9, 2018, which is a continuation of U.S. patent application Ser. No. 15/881,351 entitled "Systems and Methods for Encoding Source Media in Matroska Container Files for Adaptive Bitrate Streaming Using Hypertext Transfer Protocol" to Braness et al., filed Jan. 26, 2018, which is a continuation of U.S. patent application Ser. No. 15/005,990 entitled "Systems and Methods for Encoding Source Media in Matroska Container Files for Adaptive Bitrate Streaming Using Hypertext Transfer Protocol" to Braness et al., filed Jan. 25, 2016, which is a continuation of U.S. patent application Ser. No. 13/221,794 entitled "Systems and Methods for Encoding Source Media in Matroska Container Files for Adaptive Bitrate Streaming Using Hypertext Transfer Protocol" to Braness et al., filed Aug. 30, 2011, which application claims priority to U.S. Provisional Application Ser. No. 61/430,110, entitled "Systems and Methods For Adaptive Bitrate Streaming of Media Stored in Matroska Files Using Hypertext Transfer Protocol", filed Jan. 5, 2011. The disclosures of application Ser. Nos. 15/881,351, 15/005,990, 13/221,794 and 61/430,110 are hereby incorporated by reference in their entirety.

FIELD OF THE INVENTION

The present invention generally relates to adaptive streaming and more specifically to adaptive bitrate streaming of encoded media contained within Matroska container files using Hypertext Transfer Protocol.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format (i.e. is based upon the Matroska container format, but includes elements that are not specified within the Matroska format).

SUMMARY OF THE INVENTION

Systems and methods for adaptive bitrate streaming of media stored in Matroska container files utilizing Hypertext Transfer Protocol (HTTP) in accordance with embodiments of the invention are disclosed. One embodiment of the invention includes a processor configured via a source encoding application to ingest at least one multimedia file containing a source video. In addition, the source encoding application further configures the processor to select a portion of the source video, transcode the selected portion of the source video into a plurality of alternative portions of encoded video, where each alternative portion is encoded using a different set of encoding parameters and commences with an intra frame starting a closed Group of Pictures (GOP), write each of the alternative portions of encoded video to an element of a different EBML container file, where each element is located within an EBML container file that also includes another element that indicates the encoding parameters used to encode the alternative portion of encoded video, and add an entry to at least one index that identifies the location of the element containing one of the alternative portions of encoded video within each of the EBML container files.

In a further embodiment, transcoding a selected portion of the source video further comprises transcoding the selected portion into at least one closed group of pictures.

In another embodiment, the portion of source video is selected based upon the duration of the selected portion of source video.

In a still further embodiment, the source encoding application configures the processor to select a portion of the source video having a duration of two seconds.

In still another embodiment, each of the alternative portions of encoded video is encoded with a different maximum bitrate.

In a yet further embodiment, at least two of the alternative portions of encoded video are encoded with different resolutions.

In yet another embodiment, at least two of the alternative portions of encoded video are encoded with different frame rates.

In a further embodiment again, the element of the EBML container file to which each alternative portion of encoded video is written is a Cluster element containing a time code and the portion of encoded video is contained within Block-Group elements within the Cluster element.

In another embodiment again, each encoded frame of the alternative portion of encoded video contained within the Cluster element is contained within a separate BlockGroup element.

In further additional embodiment, the first BlockGroup element in the Cluster element contains the IDR frame.

In another additional embodiment, the first BlockGroup element contains a Block element, which specifies the time code attribute of the IDR frame relative to the time code of the Cluster element.

In a still yet further embodiment, each element to which each of the alternative portions of encoded video is written is assigned the same time code.

In still yet another embodiment, the source encoding application further configures the processor to create an index for each of the EBML container files.

In a still further embodiment again, the source encoding application further configures the processor to add the location of the element containing one of the alternative portions of encoded video within each of the EBML container files to the index for the EBML container file.

In still another embodiment again, the source encoding application further configures the processor to pack the index for each EBML container file into the EBML container file.

In a still further additional embodiment, each index comprises a Cues element.

In still another additional embodiment, each Cues element includes a CuePoint element that points to the location of the element containing one of the alternative portions of encoded video within the EBML file.

In a yet further embodiment again, the source encoding application further configures the processor to create a top level index file that identifies each of the EBML container files.

In yet another embodiment again, the ingested multimedia file also includes source audio.

In a yet further additional embodiment, the source encoding application configures the processor to multiplex the audio into each of the EBML container files.

In yet another additional embodiment, wherein the source encoding application configures the processor to write the audio to a separate EBML container file.

In a further additional embodiment again, the source encoding application further configures the processor to transcode at least one of the at least one audio tracks.

In another additional embodiment again, the ingested multimedia file further comprises subtitles.

In a still yet further embodiment again, the source encoding application configures the processor to multiplex the subtitles into each of the EBML container files.

In still yet another embodiment again, the source encoding application configures the processor to write the subtitles to a separate EBML container file.

In a still yet further additional embodiment, the source encoding application further configures the processor to transcode the source video to create a lower frame rate trick play track and to write the trick play track to a separate EBML container file.

In still yet another additional embodiment, the trick play track is also lower resolution than the source video.

In a yet further additional embodiment again, the source encoding application further configures the processor to write the element containing a set of encoding parameters in each of the EBML container files.

In yet another additional embodiment again, the set of encoding parameters includes at least one parameter selected from the group consisting of frame rate, frame height, frame width, sample aspect ratio, maximum bitrate, and minimum buffer size.

Another further embodiment includes repeatedly selecting a portion of the source video using the source encoder, transcoding the selected portion of the source video into a plurality of alternative portions of encoded video using the source encoder, where each alternative portion is encoded using a different set of encoding parameters and commences with an intra frame starting a closed Group of Pictures (GOP), writing each of the alternative portions of encoded video to an element of a different EBML container file using the source encoder, where each element is located within an EBML container file that also includes another element containing a set of encoding parameters corresponding to the encoding parameters used to encode the portion of video, and adding an entry to at least one index that identifies the location of the element containing one of the alternative portions of encoded video within each of the EBML container files.

DETAILED DISCLOSURE OF THE INVENTION

Figure 1:
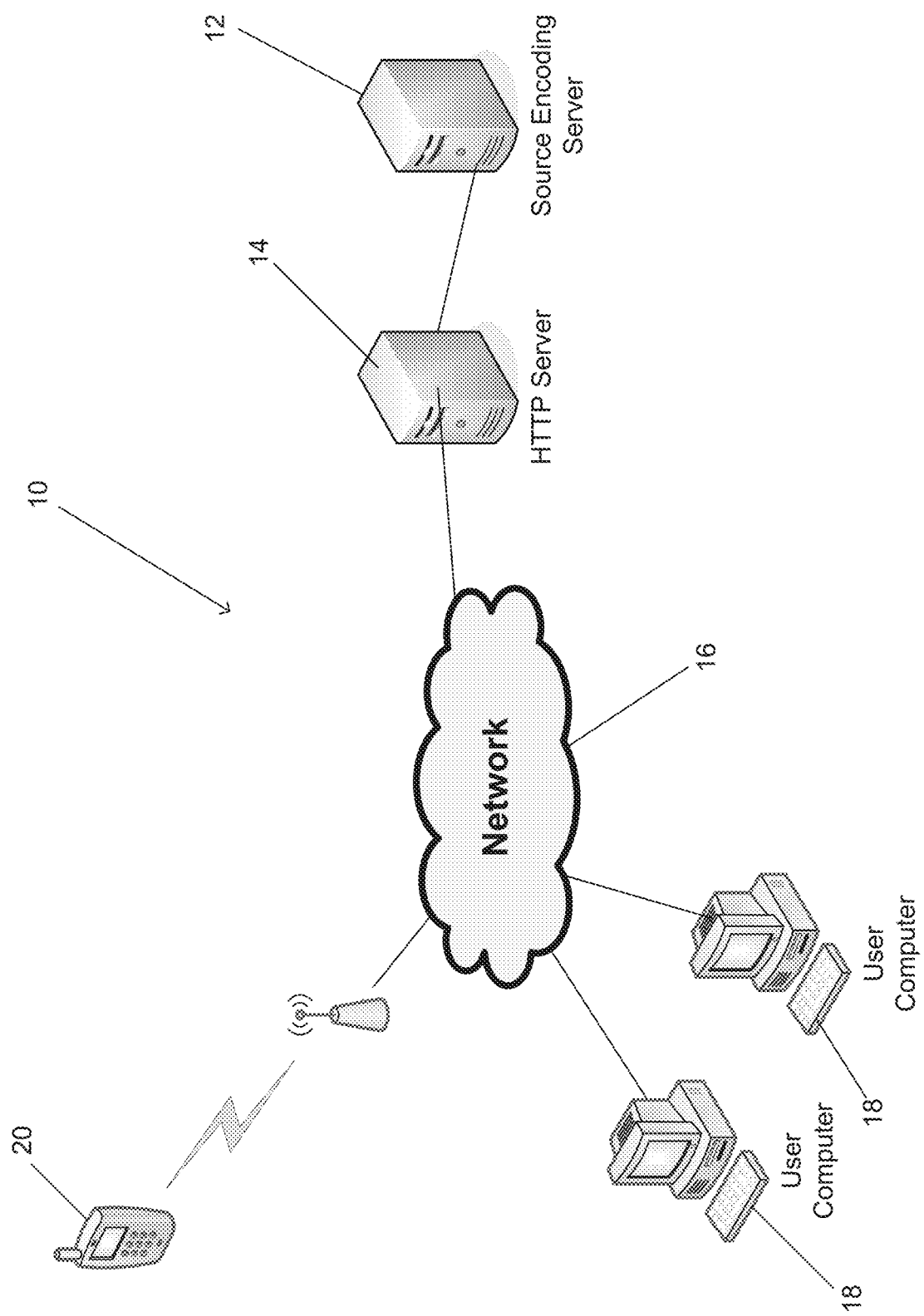
FIG. 1 is a network diagram of an adaptive bitrate streaming system in accordance with an embodiment of the invention.

Turning now to the drawings, systems and methods for encoding source media in Matroska container files for adaptive bitrate streaming utilizing Hypertext Transfer Protocol (HTTP) in accordance with embodiments of the invention are illustrated. In a number of embodiments, source media is encoded as a number of alternative streams. Each stream is stored in a Matroska (MKV) container file. In many embodiments, the Matroska container file is a specialized Matroska container file in that the manner in which the media in each stream is encoded and stored within the container is constrained to improve streaming performance. In several embodiments, the Matroska container file is further specialized in that additional index elements (i.e. elements that are not specified as part of the Matroska container format) can be included within the file to facilitate the retrieval of desired media during adaptive bitrate streaming. In several embodiments, each stream (i.e. audio, video, or subtitle) is stored within a separate Matroska container file. In other embodiments, an encoded video stream is multiplexed with one or more encoded audio, and/or subtitle streams in each Matroska container file. A top level index file containing an index to the streams contained within each of the container files is also generated to enable adaptive bitrate streaming of the encoded media. In many embodiments, the top level index file is a Synchronized Multimedia Integration Language (SMIL) file containing URIs for each of the Matroska container files. In other embodiments, any of a variety of file formats can be utilized in the generation of the top level index file.

The performance of an adaptive bitstrate streaming system in accordance with embodiments of the invention can be significantly enhanced by encoding each portion of the source video at each bit rate in such a way that the portion of video is encoded in each stream as a single (or at least one) closed group of pictures (GOP) starting with an Instantaneous Decoder Refresh (IDR) frame. The GOP for each stream can then be stored as a Cluster element within the Matroska container file for the stream. In this way, the playback device can switch between streams at the completion of the playback of a Cluster and, irrespective of the stream from which a Cluster is obtained the first frame in the Cluster will be an IDR frame and can be decoded without reference to any encoded media other than the encoded media contained within the Cluster element. In many embodiments, the sections of the source video that are encoded as GOPs are all the same duration. In a number of embodiments each two second sequence of the source video is encoded as a GOP.

Retrieval of media using HTTP during adaptive streaming can be improved by adding additional index information to the Matroska container files used to contain each of the encoded streams. In a number of embodiments, the index is a reduced index in that the index only points to the IDRs at the start of each cluster. In many embodiments, the index of the Matroska container file includes additional non-standard attributes (i.e. attributes that do not form part of the Matroska container file format specification) that specify the size of each of the clusters so that a playback device can retrieve a Cluster element from the Matroska container file via HTTP using a byte range request.

Adaptive streaming of source media encoded in the manner outlined above can be coordinated by a playback device in accordance with embodiments of the invention. The playback device obtains information concerning each of the available streams from the top level index file and selects one or more streams to utilize in the playback of the media. The playback device can then obtain header information from the Matroska container files containing the one or more bitstreams or streams, and the headers provide information concerning the decoding of the streams. The playback device can also request index information that indexes the encoded media stored within the relevant Matroska container files. The index information can be stored within the Matroska container files or separately from the Matroska container files in the top level index or in separate index files. The index information enables the playback device to request byte ranges corresponding to Cluster elements within the Matroska container file containing specific portions of encoded media via HTTP from the server. As the playback device receives the Cluster elements from the HTTP server, the playback device can evaluate current streaming conditions to determine whether to increase or decrease the bitrate of the streamed media. In the event that the playback device determines that a change in bitrate is necessary, the playback device can obtain header information and index information for the container file(s) containing the desired stream(s) (assuming the playback device has not already obtained this information). The index information can then be used to identify the byte range of the Cluster element containing the next portion of the source media encoded at the desired bit rate and the identified Cluster element can be retrieved from the server via HTTP. The next portion of the source media that is requested is typically identified based upon the Cluster elements already requested by the playback device and the Cluster elements buffered by the playback device. The next portion of source media requested from the alternative stream is requested to minimize the likelihood that the buffer of the playback device will underflow (i.e. run out media to playback) prior to receipt of the Cluster element containing the next portion of source media by the playback device. In this way, the playback device can achieve adaptive bitrate streaming by retrieving sequential Cluster elements from the various streams as appropriate to the streaming conditions using the top level index and index information describing the Cluster elements within each of the Matroska container files.

In a number of embodiments, variation in the bitrate between different streams can be achieved by modifying the encoding parameters for each stream including but not limited to the bitrate, frame rate, and resolution. When different streams include different resolutions, the display aspect ratio of each stream is the same and the sample aspect ratios are modified to ensure smooth transitions from one resolution to another. The encoding of source video for use in adaptive bitrate streaming and the playback of the encoded source video using HTTP requests to achieve adaptive bitrate streaming in accordance with embodiments of the invention is discussed further below.

Adaptive Streaming System Architecture

An adaptive streaming system in accordance with an embodiment of the invention is illustrated in FIG. 1. The adaptive streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). As is discussed further below, the source encoding server 12 generates a top level index to a plurality of container files containing the streams, at least a plurality of which are alternative streams. Alternative streams are streams that encode the same media content in different ways. In many instances, alternative streams encode media content (such as but not limited to video) at different bitrates. In a number of embodiments, the alternative streams are encoded with different resolutions and/or at different frame rates. The top level index file and the container files are uploaded to an HTTP server 14. A variety of playback devices can then use HTTP or another appropriate stateless protocol to request portions of the top level index file and the container files via a network 16 such as the Internet.

In many embodiments, the top level index file is a SMIL file and the media is stored in Matroska container files. As is discussed further below, the media can be stored within the Matroska container file in a way that facilitates the adaptive bitrate streaming of the media. In many embodiments, the Matroska container files are specialized Matroska container files that include enhancements (i.e. elements that do not form part of the Matroska file format specification) that facilitate the retrieval of specific portions of media via HTTP during the adaptive bitrate streaming of the media.

In the illustrated embodiment, playback devices include personal computers 18 and mobile phones 20. In other embodiments, playback devices can include consumer electronics devices such as DVD players, Blu-ray players, televisions, set top boxes, video game consoles, tablets, and other devices that are capable of connecting to a server via HTTP and playing back encoded media. Although a specific architecture is shown in FIG. 1 any of a variety of architectures can be utilized that enable playback devices to request portions of the top level index file and the container files in accordance with embodiments of the invention.

File Structure

Figure 2:
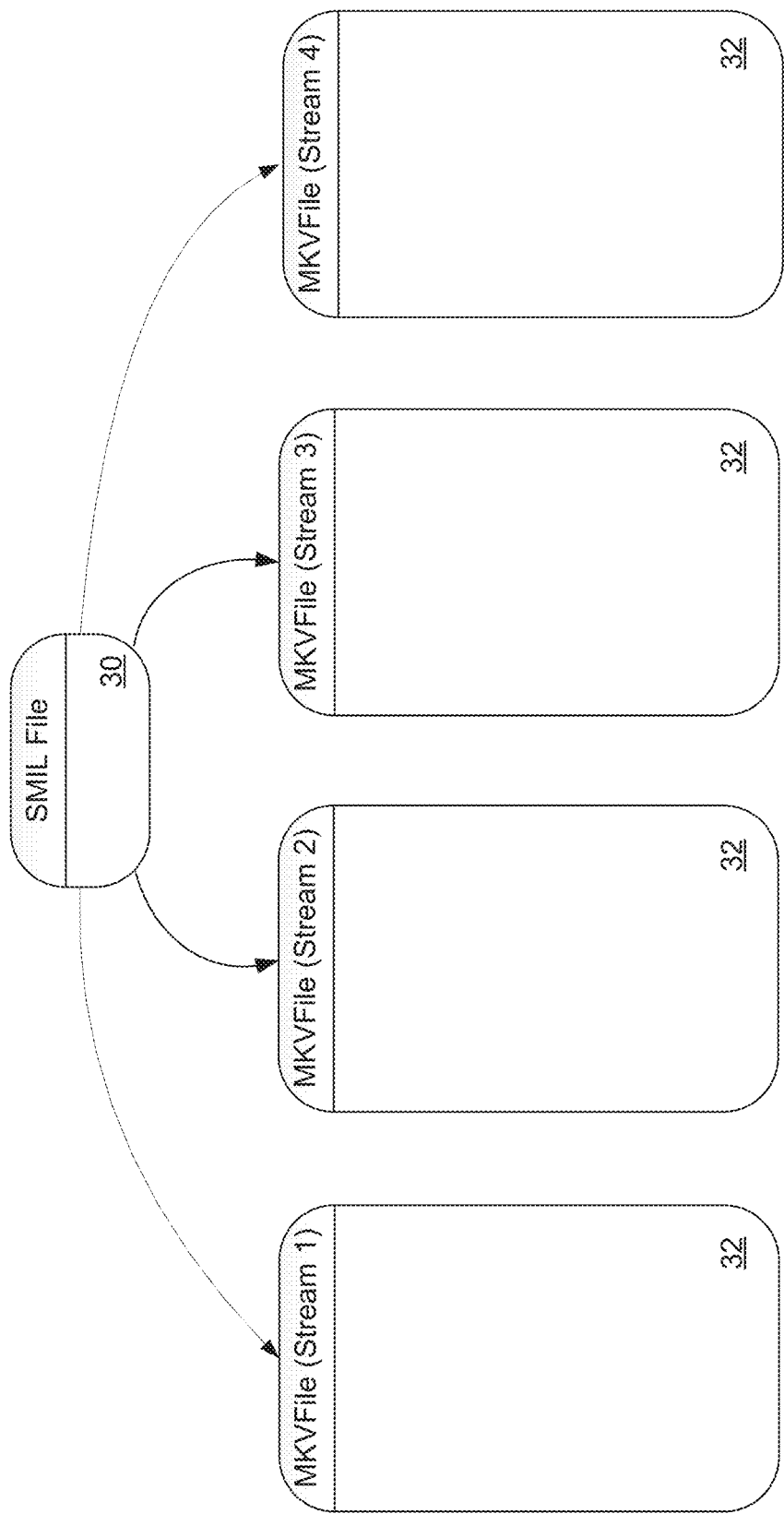
FIG. 2 conceptually illustrates a top level index file and Matroska container files generated by the encoding of source media in accordance with embodiments of the invention.

Files generated by a source encoder and/or stored on an HTTP server for streaming to playback devices in accordance with embodiments of the invention are illustrated in FIG. 2. The files utilized in the adaptive bitrate streaming of the source media include a top level index 30 and a plurality of container files 32 that each contain at least one stream. The top level index file describes the content of each of the container files. As is discussed further below, the top level index file can take a variety of forms including an SMIL file and the container files can take a variety of forms including a specialized Matroska container file.

In many embodiments, each Matroska container file contains a single stream. For example, the stream could be one of a number of alternate video streams, an audio stream, one of a number of alternate audio streams, a subtitle stream, one of a number of alternate subtitle streams, a trick play stream, or one of a number of alternate trick play streams. In several embodiments, the Matroska container file includes multiple multiplexed streams. For example, the Matroska container could include a video stream, and one or more audio streams, one or more subtitle streams, and/or one or more trick play streams. As is discussed further below, in many embodiments the Matroska container files are specialized files. The encoding of the media and the manner in which the media is stored within Cluster elements within the Matroska container file can be subject to constraints designed to enhance the performance of an adaptive bitrate streaming system. In addition, the Matroska container file can include index elements that facilitate the location and downloading of Cluster elements from the various Matroska container files during the adaptive streaming of the media. Top level index files and Matroska container files that can be used in adaptive bitrate streaming systems in accordance with embodiments of the invention are discussed below.

Top Level Index Files

Playback devices in accordance with many embodiments of the invention utilize a top level index file to identify the container files that contain the streams available to the playback device for use in adaptive bitrate streaming. In many embodiments, the top level index files can include references to container files that each include an alternative stream of encoded media. The playback device can utilize the information in the top level index file to retrieve encoded media from each of the container files according to the streaming conditions experienced by the playback device.

In several embodiments, the top level index file provides information enabling the playback device to retrieve information concerning the encoding of the media in each of the container files and an index to encoded media within each of the container files. In a number of embodiments, each container file includes information concerning the encoded media contained within the container file and an index to the encoded media within the container file and the top level index file indicates the portions of each container file containing this information. Therefore, a playback device can retrieve the top level index file and use the top level index file to request the portions of one or more of the container files that include information concerning the encoded media contained within the container file and an index to the encoded media within the container file. A variety of top level index files that can be utilized in adaptive bitrate streaming systems in accordance with embodiments of the invention are discussed further below.

Top Level Index SMIL Files

In a number of embodiments, the top level index file utilized in the adaptive bitrate streaming of media is a SMIL file, which is an XML file that includes a list of URIs describing each of the streams and the container files that contain the streams. The URI can include information such as the "system-bitrate" of the stream contained within the stream and information concerning the location of specific pieces of data within the container file.

The basic structure of a SMIL file involves providing an XML declaration and a SMIL element. The SMIL element defines the streams available for use in adaptive bitrate streaming and includes a HEAD element, which is typically left empty and a BODY element that typically only contains a PAR (parallel) element. The PAR element describes streams that can be played simultaneously (i.e. include media that can be presented at the same time).

The SMIL specification defines a number of child elements to the PAR element that can be utilized to specify the streams available for use in adaptive bitrate streaming. The VIDEO, AUDIO and TEXTSTREAM elements can be utilized to define a specific video, audio or subtitle stream. The VIDEO, AUDIO and TEXTSTREAM elements can collectively be referred to as media objects. The basic attributes of a media object are the SRC attribute, which specifies the full path or a URI to a container file containing the relevant stream, and the XML:LANG attribute, which includes a 3 letter language code. Additional information concerning a media object can be specified using the PARAM element. The PARAM element is a standard way within the SMIL format for providing a general name value pair. In a number of embodiments of the invention, specific PARAM elements are defined that are utilized during adaptive bitrate streaming.

In many embodiments, a "header-request" PARAM element is defined that specifies the size of the header section of the container file containing the stream. The value of the "header-request" PARAM element typically specifies the number of bytes between the start of the file and the start of the encoded media within the file. In many embodiments, the header contains information concerning the manner in which the media is encoded and a playback device retrieves the header prior to playback of the encoded media in order to be able to configure the decoder for playback of the encoded media. An example of a "header-request" PARAM element is follows:

```
<param
    name="header-request"
    value="1026"
    valuetype="data" />
```

In a number of embodiments, a "mime" PARAM element is defined that specifies the MIME type of the stream. A "mime" PARAM element that identifies the stream as being an H.264 stream (i.e. a stream encoded in accordance with the MPEG-4 Advanced Video Codec standard) is as follows:

```
<param
    name="mime"
    value="V_MPEG4/ISO/AVC"
    valuetype="data" />
```

The MIME type of the stream can be specified using a "mime" PARAM element as appropriate to the encoding of a specific stream (e.g. AAC audio or UTF-8 text stream).

When the media object is a VIDEO element, additional attributes are defined within the SMIL file format specification including the systemBitrate attribute, which specifies the bitrate of the stream in the container file identified by the VIDEO element, and width and height attributes, which specify the dimensions of the encoded video in pixels. Additional attributes can also be defined using the PARAM element. In several embodiments, a "vbv" PARAM element is defined that specified the VBV buffer size of the video stream in bytes. The video buffering verifier (VBV) is a theoretical MPEG video buffer model used to ensure that an encoded video stream can be correctly buffered and played back at the decoder device. An example of a "vbv" PARAM element that specifies a VBV size of 1000 bytes is as follows:

```
<param
    name="vbv"
    value="1000"
    valuetype="data" />
```

An example of VIDEO element including the attributes discussed above is as follows:

```
<video
    src="http://cnd.com/video1_620kbps.mkv"
    systemBitrate="620"
    width="480"
    height="270" >
    <param
        name="vbv"
        value="1000"
        valuetype="data" />
</video>
```

Adaptive bitrate streaming systems in accordance with embodiments of the invention can support trick play streams, which can be used to provide smooth visual search through source content encoded for adaptive bitrate streaming. A trick play stream can be encoded that appears to be an accelerated visual search through the source media when played back, when in reality the trick play stream is simply a separate track encoding the source media at a lower frame rate. In many embodiments of the system a VIDEO element that references a trick play track is indicated by the systemProfile attribute of the VIDEO element. In other embodiments, any of a variety of techniques can be utilized to signify within the top level index file that a specific stream is a trick play stream. An example of a trick play stream VIDEO element in accordance with an embodiment of the invention is as follows:

```
<video
    src="http://cnd.com/video_test2_600kbps.mkv"
    systemProfile="DivXPlusTrickTrack"
    width="480"
    height="240">
    <param name="vbv" value="1000" valuetype="data" />
    <param name="header-request" value="1000" valuetype="data" />
</video>
```

In a number of embodiments of the invention, a "reservedBandwidth" PARAM element can be defined for an AUDIO element. The "reservedBandwidth" PARAM element specifies the bitrate of the audio stream in Kbps. An example of an AUDIO element specified in accordance with an embodiment of the invention is as follows:

```
<audio
    src="http://cnd.com/audio_test1_277kbps.mkv"
    xml:lang="gem"
<param
    name="reservedBandwidth"
    value="128"
    valuetype="data" />
/>
```

In several embodiments, the "reservedBandwidth" PARAM element is also defined for a TEXTSTREAM element. An example of a TEXTSTREAM element including a "reservedBandwidth" PARAM element in accordance with an embodiment of the invention is as follows:

```
<textstream
    src="http://cnd.com/text_stream_ger.mkv"
    xml:lang="gem"
<param
    name="reservedBandwidth"
    value="32"
    valuetype="data" />
/>
```

In other embodiments, any of a variety of mechanisms can be utilized to specify information concerning VIDEO, AUDIO, and SUBTITLE elements as appropriate to specific applications.

A SWITCH element is a mechanism defined within the SMIL file format specification that can be utilized to define adaptive or alternative streams. An example of the manner in which a SWITCH element can be utilized to specify alternative video streams at different bitrates is as follows:

```
<switch>
    <video src="http://cnd.com/video_test1_300kbps.mkv"/>
    <video src="http://cnd.com/video_test2_900kbps.mkv"/>
    <video src="http://cnd.com/video_test3_1200kbps.mkv"/>
</switch>
```

The SWITCH element specifies the URLs of three alternative video streams. The file names indicate that the different bitrates of each of the streams. As is discussed further below, the SMIL file format specification provides mechanisms that can be utilized in accordance with embodiments of the invention to specify within the top level index SMIL file additional information concerning a stream and the container file in which it is contained.

In many embodiments of the invention, the EXCL (exclusive) element is used to define alternative tracks that do not adapt during playback with streaming conditions. For example, the EXCL element can be used to define alternative audio tracks or alternative subtitle tracks. An example of the manner in which an EXCL element can be utilized to specify alternative English and French audio streams is as follows:

```
<excl>
    <audio
        src="http://cnd.com/english-audio.mkv"
        xml:lang="eng"/>
    <audio
        src="http://cnd.com/french-audio.mkv"
        xml:lang="fre"/>
</excl>
```

An example of a top level index SMIL file that defines the attributes and parameters of two alternative video levels, an audio stream and a subtitle stream in accordance with an embodiment of the invention is as follows:

```
<?xml version="1.0" encoding="utf-8"?>
<smil xmlns="http://www.w3.org/ns/SMIL" version="3.0"
baseProfile="Language">
    <head>
    </head>
    <body>
        <par>
            <switch>
                <video
                    src="http://cnd.com/video_test1_300kbps.mkv"
                    systemBitrate="300"
                    vbv="600"
                    width="320"
                    height="240" >
                    <param
                        name="vbv"
                        value="600"
                        valuetype="data" />
                    <param
                        name="header-request"
                        value="1000"
                        valuetype="data" />
                </video>
                <video
                    src="http://cnd.com/video_test2_600kbps.mkv"
                    systemBitrate="600"
                    vbv ="900"
                    width="640"
                    height="480">
                    <param
                        name="vbv"
                        value="1000"
                        valuetype="data" />
                    <param
                        name="header-request"
                        value="1000"
                        valuetype="data" />
                </video>
            </switch>
            <audio
                src="http://cnd.com/audio.mkv"
                xml:lang="eng">
                <param
                    name="header-request"
                    value="1000"
                    valuetype="data" />
                <param name="reservedBandwidth" value="128"
                    valuetype="data" />
            </audio>
            <textstream
                src="http://cnd.com/subtitles.mkv"
                xml:lang="eng">
                <param
                    name="header-request"
                    value="1000"
                    valuetype="data" />
                <param name="reservedBandwidth" value="32"
                    valuetype="data" />
            </textstream>
        </par>
    </body>
</smil>
```

The top level index SMIL file can be generated when the source media is encoded for playback via adaptive bitrate streaming. Alternatively, the top level index SMIL file can be generated when a playback device requests the commencement of playback of the encoded media. When the playback device receives the top level index SMIL file, the playback device can parse the SMIL file to identify the available streams. The playback device can then select the streams to utilize to playback the content and can use the SMIL file to identify the portions of the container file to download to obtain information concerning the encoding of a specific stream and/or to obtain an index to the encoded media within the container file.

Although top level index SMIL files are described above, any of a variety of top level index file formats can be utilized to create top level index files as appropriate to a specific application in accordance with an embodiment of the invention. The use of top level index files to enable playback of encoded media using adaptive bitrate streaming in accordance with embodiments of the invention is discussed further below.

Storing Media in Matroska Files for Adaptive Bitrate Streaming

Figure 3:
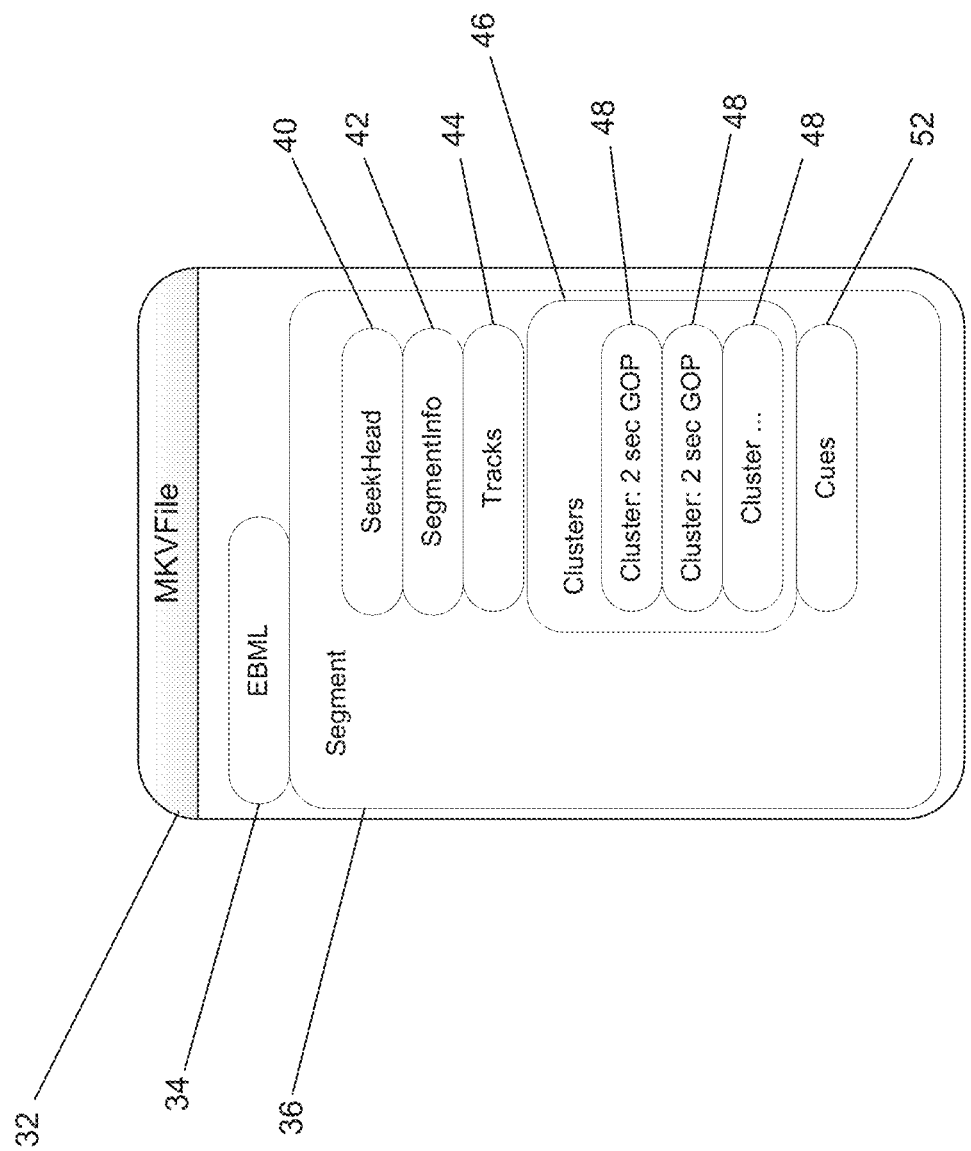
FIG. 3 conceptually illustrates a specialized Matroska container file incorporating a modified Cues element in accordance with an embodiment of the invention.

A Matroska container file used to store encoded video in accordance with an embodiment of the invention is illustrated in FIG. 3. The container file 32 is an Extensible Binary Markup Language (EBML) file that is an extension of the Matroska container file format. The specialized Matroska container file 32 includes a standard EBML element 34, and a standard Segment element 36 that includes a standard Seek Head element 40, a standard Segment Information element 42, and a standard Tracks element 44. These standard elements describe the media contained within the Matroska container file. The Segment element 36 also includes a standard Clusters element 46. As is described below, the manner in which encoded media is inserted within individual Cluster elements 48 within the Clusters element 46 is constrained to improve the playback of the media in an adaptive streaming system. In many embodiments, the constraints imposed upon the encoded video are consistent with the specification of the Matroska container file format and involve encoding the video so that each cluster includes at least one closed GOP commencing with an IDR frame. In addition to the above standard elements, the Segment element 36 also includes a modified version of the standard Cues element 52. As is discussed further below, the Cues element includes specialized CuePoint elements (i.e. non-standard CuePoint elements) that facilitate the retrieval of the media contained within specific Cluster elements via HTTP.

The constraints imposed upon the encoding of media and the formatting of the encoded media within the Clusters element of a Matroska container file for adaptive bitrate streaming and the additional index information inserted within the container file in accordance with embodiments of the invention is discussed further below.

Encoding Media for Insertion in Cluster Elements

An adaptive bitrate streaming system provides a playback device with the option of selecting between different streams of encoded media during playback according to the streaming conditions experienced by the playback device. In many embodiments, switching between streams is facilitated by separately pre-encoding discrete portions of the source media in accordance with the encoding parameters of each stream and then including each separately encoded portion in its own Cluster element within the stream's container file. Furthermore, the media contained within each cluster is encoded so that the media is capable of playback without reference to media contained in any other cluster within the stream. In this way, each stream includes a Cluster element corresponding to the same discrete portion of the source media and, at any time, the playback device can select the Cluster element from the stream that is most appropriate to the streaming conditions experienced by the playback device and can commence playback of the media contained within the Cluster element. Accordingly, the playback device can select clusters from different streams as the streaming conditions experienced by the playback device change over time. In several embodiments, the Cluster elements are further constrained so that each Cluster element contains a portion of encoded media from the source media having the same duration. In a number of embodiments, each Cluster element includes two seconds of encoded media. The specific constraints applied to the media encoded within each Cluster element depending upon the type of media (i.e. video, audio, or subtitles) are discussed below.

Figures 4A, 4B:
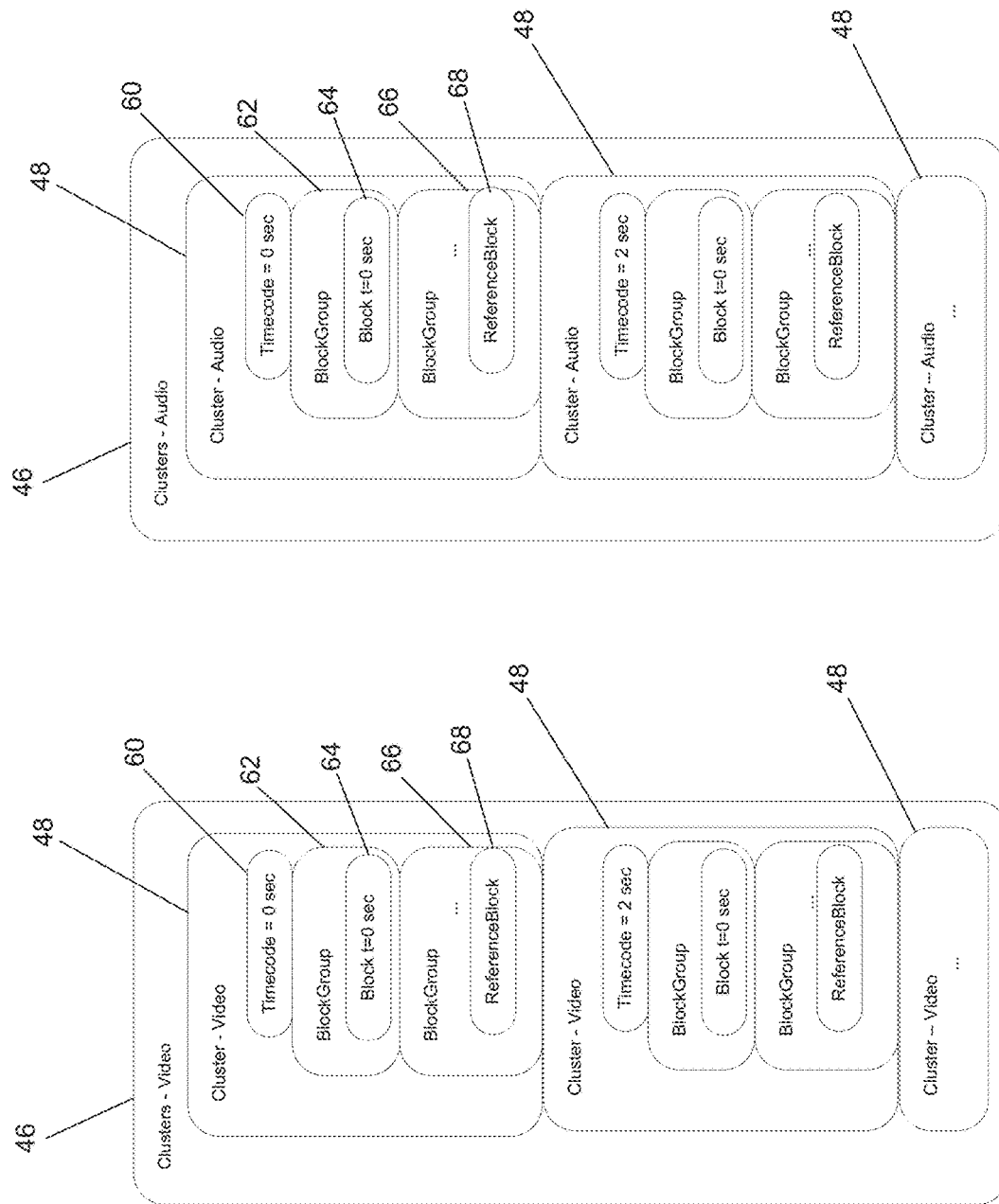
FIGS. 4a-4c conceptually illustrate the insertion of different types of media into the Clusters element of a Matroska container file subject to various constrains that facilitate adaptive bitrate streaming in accordance with embodiments of the invention.

A Clusters element of a Matroska container file containing a video stream in accordance with an embodiment of the invention is illustrated in FIG. 4a. The Clusters element 46 includes a plurality of Cluster elements 48 that each contains a discrete portion of encoded video. In the illustrated embodiment, each Cluster element 48 includes two seconds of encoded video. In other embodiments, the Cluster elements include encoded video having a greater or lesser duration than two seconds. The smaller the Cluster elements (i.e. the smaller the duration of the encoded media within each Cluster element), the higher the overhead associated with requesting each Cluster element. Therefore, a tradeoff exists between the responsiveness of the playback device to changes in streaming conditions and the effective data rate of the adaptive streaming system for a given set of streaming conditions (i.e. the portion of the available bandwidth actually utilized to transmit encoded media). In several embodiments, the encoded video sequences in the Cluster elements have different durations. Each Cluster element 48 includes a Timecode element 60 indicating the start time of the encoded video within the Cluster element and a plurality of BlockGroup elements. As noted above, the encoded video stored within the Cluster is constrained so that the encoded video can be played back without reference to the encoded video contained within any of the other Cluster elements in the container file. In many embodiments, encoding the video contained within the Cluster element as a GOP in which the first frame is an IDR frame enforces the constraint. In the illustrated embodiment, the first BlockGroup element 62 contains an IDR frame. Therefore, the first BlockGroup element 62 does not include a ReferenceBlock element. The first BlockGroup element 62 includes a Block element 64, which specifies the Timecode attribute of the frame encoded within the Block element 64 relative to the Timecode of the Cluster element 48. Subsequent BlockGroup elements 66 are not restricted in the types of frames that they can contain (other than that they cannot reference frames that are not contained within the Cluster element). Therefore, subsequent BlockGroup elements 66 can include ReferenceBlock elements 68 referencing other BlockGroup element(s) utilized in the decoding of the frame contained within the BlockGroup or can contain IDR frames and are similar to the first BlockGroup element 62. As noted above, the manner in which encoded video is inserted within the Cluster elements of the Matroska file conforms with the specification of the Matroska file format.

Figures 4C, 4D:
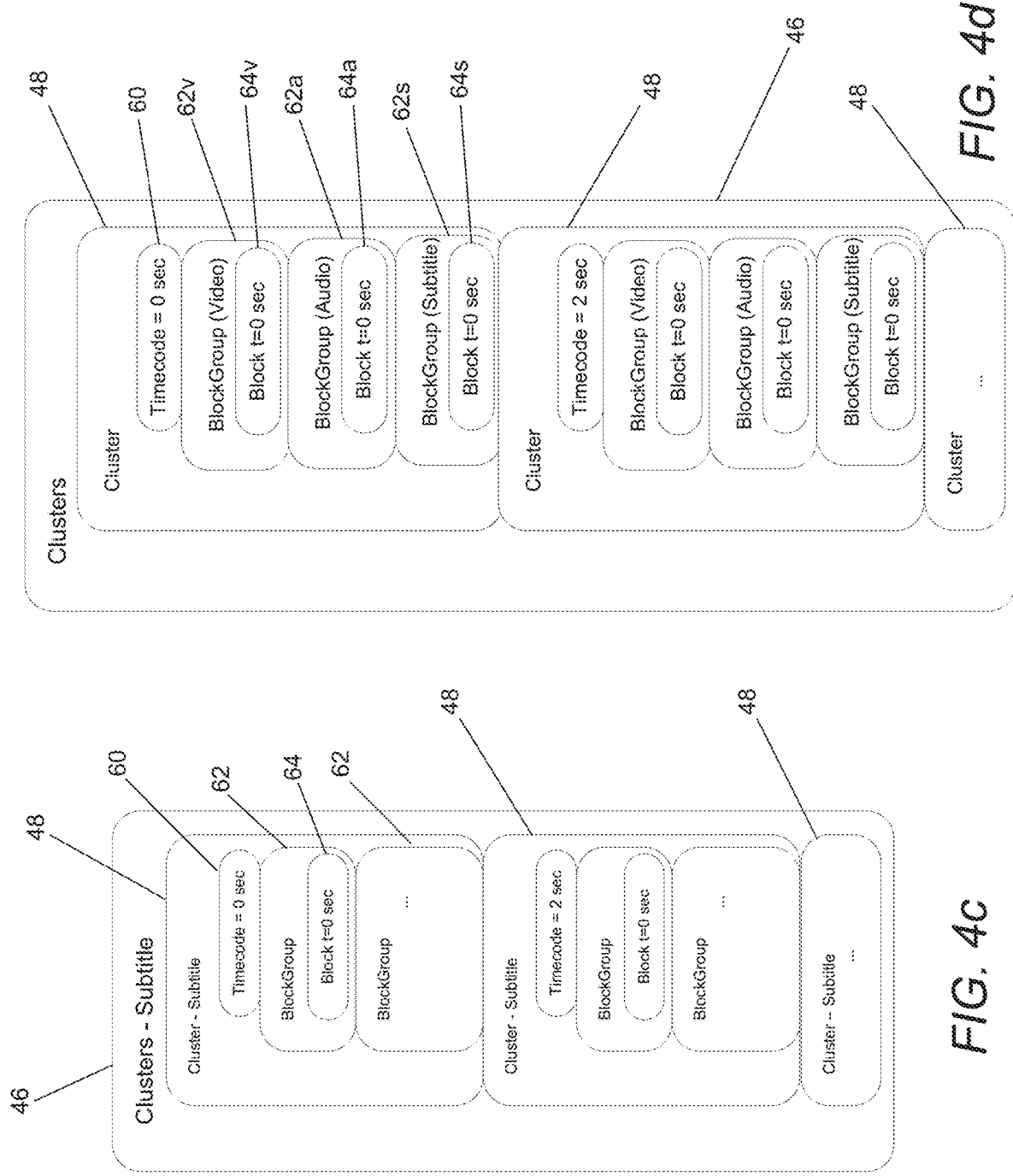
FIG. 4d conceptually illustrates the multiplexing of different types of media into the Clusters element of a Matroska container file subject to various constraints that facilitate adaptive bitrate streaming in accordance with an embodiment of the invention.

The insertion of encoded audio and subtitle information within a Clusters element 46 of a Matroska container file in accordance with embodiments of the invention is illustrated in FIGS. 4b and 4c. In the illustrated embodiments, the encoded media is inserted within the Cluster elements 48 subject to the same constraints applied to the encoded video discussed above with respect to FIG. 4a. In addition, the duration of the encoded audio and subtitle information within each Cluster element corresponds to the duration of the encoded video in the corresponding Cluster element of the Matroska container file containing the encoded video. In other embodiments, the Cluster elements within the container files containing the audio and/or subtitle streams need not correspond with the start time and duration of the Cluster elements in the container files containing the alternative video streams.

Multiplexing Streams in a Single MKV Container File

The Clusters elements shown in FIGS. 4a-4c assume that a single stream is contained within each Matroska container file. In several embodiments, media from multiple streams is multiplexed within a single Matroska container file. In this way, a single container file can contain a video stream multiplexed with one or more corresponding audio streams, and/or one or more corresponding subtitle streams. Storing the streams in this way can result in duplication of the audio and subtitle streams across multiple alternative video streams. However, the seek time to retrieve encoded media from a video stream and an associated audio, and/or subtitle stream can be reduced due to the adjacent storage of the data on the server. The Clusters element 46 of a Matroska container file containing multiplexed video, audio and subtitle data in accordance with an embodiment of the invention is illustrated in FIG. 4d. In the illustrated embodiment, each Cluster element 48 includes additional BlockGroup elements for each of the multiplexed streams. The first Cluster element includes a first BlockGroup element 62v for encoded video that includes a Block element 64v containing an encoded video frame and indicating the Timecode attribute of the frame relative to the start time of the Cluster element (i.e. the Timecode attribute 60). A second BlockGroup element 62a includes a Block element 64a including an encoded audio sequence and indicating the timecode of the encoded audio relative to the start time of the Cluster element, and a third BlockGroup element 62s including a Block element 64s containing an encoded subtitle and indicating the timecode of the encoded subtitle relative to the start time of the Cluster element. Although not shown in the illustrated embodiment, each Cluster element 48 likely would include additional BlockGroup elements containing additional encoded video, audio or subtitles. Despite the multiplexing of the encoded video, audio, and/or subtitle streams, the same constraints concerning the encoded media apply.

Incorporating Trick Play Tracks in MKV Container Files for Use in Adaptive Bitrate Streaming Systems The incorporation of trick play tracks within Matroska container files is proposed by DivX, LLC in U.S. patent application Ser. No. 12/260,404 entitled "Application Enhancement Tracks", filed Oct. 29, 2008, the disclosure of which is hereby incorporated by reference in its entirety. Trick play tracks similar to the trick play tracks described in U.S. patent application Ser. No. 12/260,404 can be used to provide a trick play stream in an adaptive bitrate streaming system in accordance with an embodiment of the invention to provide smooth visual search through source content encoded for adaptive bitrate streaming. A separate trick play track can be encoded that appears to be an accelerated visual search through the source media when played back, when in reality the trick play track is simply a separate track encoding the source media at a lower frame rate. In several embodiments, the tick play stream is created by generating a trick play track in the manner outlined in U.S. patent application Ser. No. 12/260,404 and inserting the trick play track into a Matroska container file subject to the constraints mentioned above with respect to insertion of a video stream into a Matroksa container file. In many embodiments, the trick play track is also subject to the further constraint that every frame in the GOP of each Cluster element in the trick play track is encoded as an IDR frame. As with the other video streams, each Cluster element contains a GOP corresponding to the same two seconds of source media as the corresponding Cluster elements in the other streams. There are simply fewer frames in the GOPs of the trick play track and each frame has a longer duration. In this way, transitions to and from a trick play stream can be treated in the same way as transitions between any of the other encoded streams are treated within an adaptive bitrate streaming system in accordance with embodiments of the invention. Playback of the frames contained within the trick play track to achieve accelerated visual search typically involves the playback device manipulating the timecodes assigned to the frames of encoded video prior to providing the frames to the playback device's decoder to achieve a desired increase in rate of accelerated search (e.g. ×2, ×4, ×6, etc.).

Figure 4E:
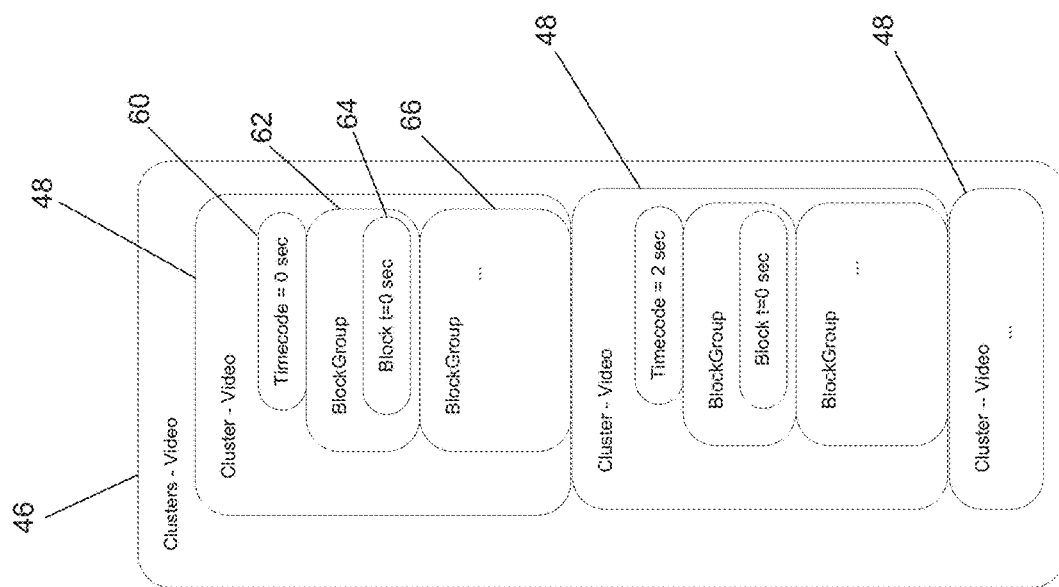
FIG. 4e conceptually illustrates the inclusion of a trick play track into the Clusters element of a Matroska container file subject to various constraints that facilitate adaptive bitrate streaming in accordance with an embodiment of the invention.

A Clusters element containing encoded media from a trick play track is shown in FIG. 4e. In the illustrated embodiment, the encoded trick play track is inserted within the Cluster elements 48 subject to the same constraints applied to the encoded video discussed above with respect to FIG. 4a. However, each Block element contains an IDR. In other embodiments, the Cluster elements within the container files containing the trick play tracks need not correspond with the start time and duration of the Cluster elements in the container files containing the alternative video streams.

In many embodiments, source content can be encoded to provide a single trick play track or multiple trick play tracks for use by the adaptive bit rate streaming system. When a single trick play track is provided, the trick play track is typically encoded at a low bitrate. When multiple alternative trick play tracks are provided, adaptive rate streaming can also be performed with respect to the trick play tracks. In several embodiments, multiple trick play tracks are provided to support different rates of accelerated visual search through the encoded media.

Incorporating Indexing Information within MKV Container Files

Figure 5:
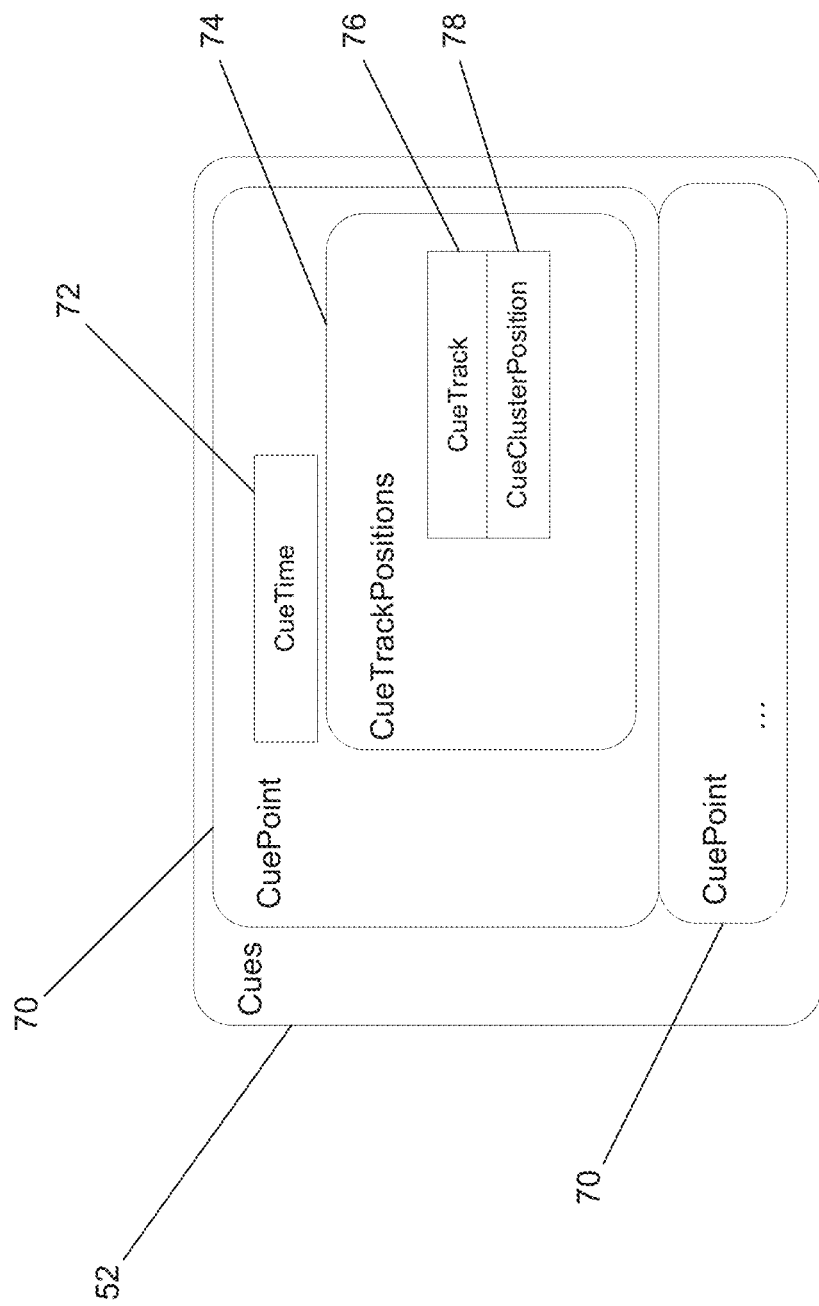
FIG. 5 conceptually illustrates a modified Cues element of a specialized Matroska container file, where the Cues element includes information enabling the retrieval of Cluster elements using HTTP byte range requests in accordance with an embodiment of the invention.

The specification for the Matroska container file format provides for an optional Cues element that is used to index Block elements within the container file. A modified Cues element 52 that can be incorporated into a Matroska container file in accordance with an embodiment of the invention to facilitate the requesting of clusters by a playback device using HTTP is illustrated in FIG. 5. The modified Cues element 52 includes a plurality of CuePoint elements 70 that each include a CueTime attribute 72. Each CuePoint element includes a CueTrackPositions element 74 containing the CueTrack 76 and CueClusterPosition 78 attributes. In many embodiments, the CuePoint element is mainly configured to identify a specific Cluster element as opposed to a specific Block element within a Cluster element. Although, in several applications the ability to seek to specific BlockGroup elements within a Cluster element is required and additional index information is included in the Cues element.

Figure 6:
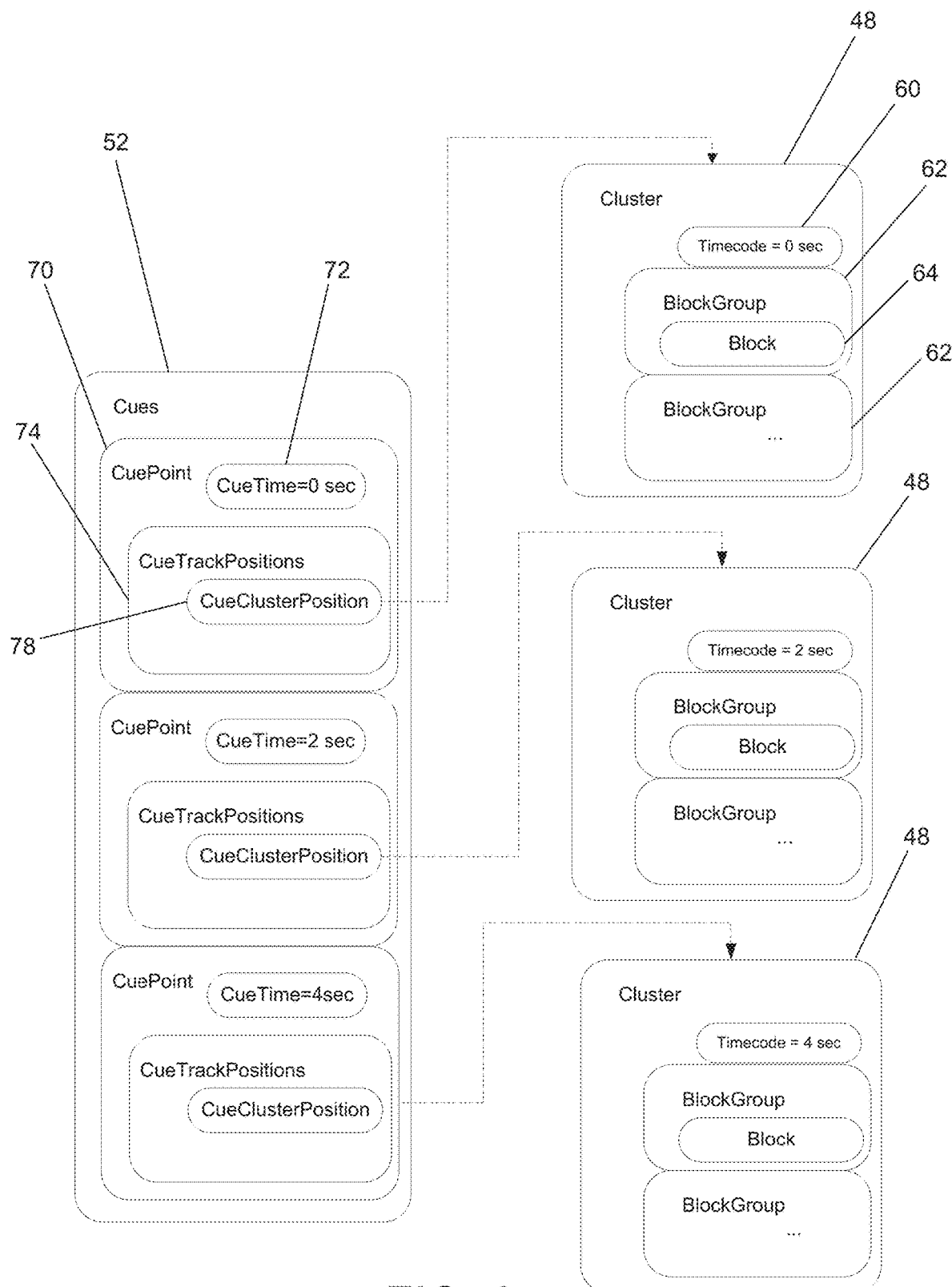
FIG. 6 conceptually illustrates the indexing of Cluster elements within a specialized Matroska container file utilizing modified CuePoint elements within the container file in accordance with embodiments of the invention.

The use of a modified Cues element to index encoded media within a Clusters element of a Matroska file in accordance with an embodiment of the invention is illustrated in FIG. 6. A CuePoint element is generated to correspond to each Cluster element within the Matroska container file. The CueTime attribute 72 of the CuePoint element 70 corresponds to the Timecode attribute 60 of the corresponding Cluster element 48. In addition, the CuePoint element contains a CueTrackPositions element 74 having a CueClusterPosition attribute 78 that points to the start of the corresponding Cluster element 48. The CueTrackPositions element 74 can also include a CueBlockNumber attribute, which is typically used to indicate the Block element containing the first IDR frame within the Cluster element 48.

As can readily be appreciated the modified Cues element 52 forms an index to each of the Cluster elements 48 within the Matroska container file. Furthermore, the CueTrackPosition elements provide information that can be used by a playback device to request the byte range of a specific Cluster element 48 via HTTP or another suitable protocol from a remote server. The Cues element of a conventional Matroska file does not directly provide a playback device with information concerning the number of bytes to request from the start of the Cluster element in order to obtain all of the encoded video contained within the Cluster element. The size of a Cluster element can be inferred in a modified Cues element by using the CueClusterPosition attribute of the CueTrackPositions element that indexes the first byte of the next Cluster element. Alternatively, additional CueTrackPosition elements could be added to modified Cues elements in accordance with embodiments of the invention that index the last byte of the Cluster element (in addition to the CueTrackPositions elements that index the first byte of the Cluster element), and/or a non-standard CueClusterSize attribute that specifies the size of the Cluster element pointed to by the CueClusterPosition attribute is included in each CueTrackPosition element to assist with the retrieval of specific Cluster elements within a Matroska container file via HTTP byte range requests or a similar protocol.

The modification of the Cues element in the manner outlined above significantly simplifies the retrieval of Cluster elements from a Matroska container file via HTTP or a similar protocol during adaptive bitrate streaming. In addition, by only indexing the first frame in each Cluster the size of the index is significantly reduced. Given that the index is typically downloaded prior to playback, the reduced size of the Cues element (i.e. index) means that playback can commence more rapidly. Using the CueClusterPosition elements, a playback device can request a specific Cluster element from the stream most suited to the streaming conditions experienced by the playback device by simply referencing the index of the relevant Matroska container file using the Timecode attribute for the desired Cluster element.

Figure 5A:
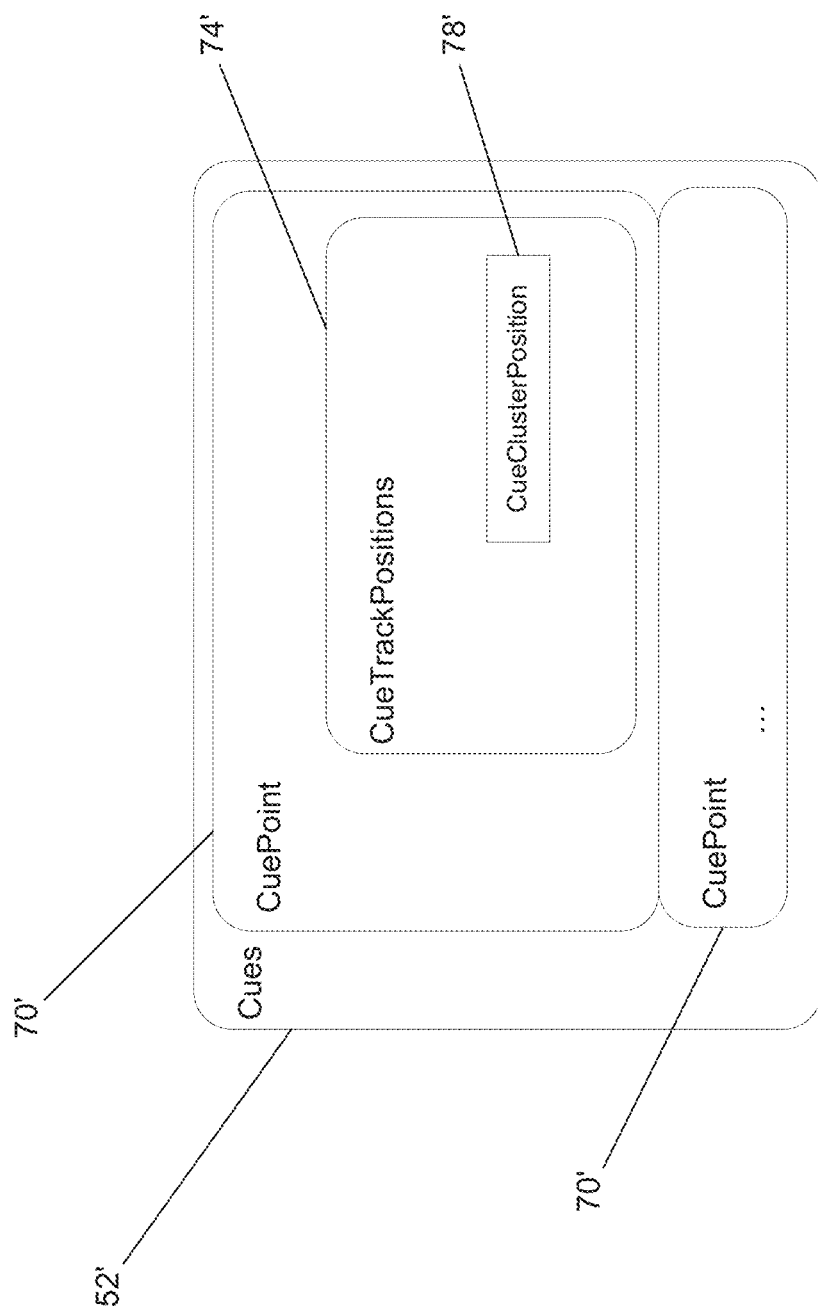
FIG. 5a conceptually illustrates a modified Cues element of a specialized Matroska container file in accordance with an embodiment of the invention, where the Cues element is similar to the Cues element shown in FIG. 5 with the exception that attributes that are not utilized during adaptive bitrate streaming are removed.

In some embodiments, a number of the attributes within the Cues element are not utilized during adaptive bitrate streaming. Therefore, the Cues element can be further modified by removing the unutilized attributes to reduce the overall size of the index for each Matroska container file. A modified Cues element that can be utilized in a Matroska container file that includes a single encoded stream in accordance with an embodiment of the invention is illustrated in FIG. 5*a*. The Cues element 52' shown in FIG. 5*a* is similar to the Cues element 52 shown in FIG. 5 with the exception that the CuePoint elements 70' do not include a CueTime attribute (see 72 in FIG. 5) and/or the CueTrackPositions elements 74' do not include a CueTrack attribute (76 in FIG. 5). When the portions of encoded media in each Cluster element in the Motroska container file have the same duration, the CueTime attribute is not necessary. When the Matroska contain file includes a single encoded stream, the CueTrack attribute is not necessary. In other embodiments, the Cues element and/or other elements of the Matroska container file can be modified to remove elements and/or attributes that are not necessary for the adaptive bitrate streaming of the encoded stream contained within the Matroska container file, given the manner in which the stream is encoded and inserted in the Matroska container file.

Although various modifications to the Cues element to include information concerning the size of each of the Cluster elements within a Matroska container file and to eliminate unnecessary attributes are described above, many embodiments of the invention utilize a conventional Matroska container. In several embodiments, the playback device simply determines the size of Cluster elements on the fly using information obtained from a conventional Cues element, and/or relies upon a separate index file containing information concerning the size and/or location of the Cluster elements within the MKV container file. In several embodiments, the additional index information is stored in the top level index file. In a number of embodiments, the additional index information is stored in separate files that are identified in the top level index file. When index information utilized to retrieve Cluster elements from a Matroska container file is stored separately from the container file, the Matroska container file is still typically constrained to encode media for inclusion in the Cluster elements in the manner outlined above. In addition, wherever the index information is located, the index information will typically index each Cluster element and include (but not be limited to) information concerning at least the starting location and, in many instances, the size of each Cluster element.

Encoding Source Media for Adaptive Bitrate Streaming

Figure 7:
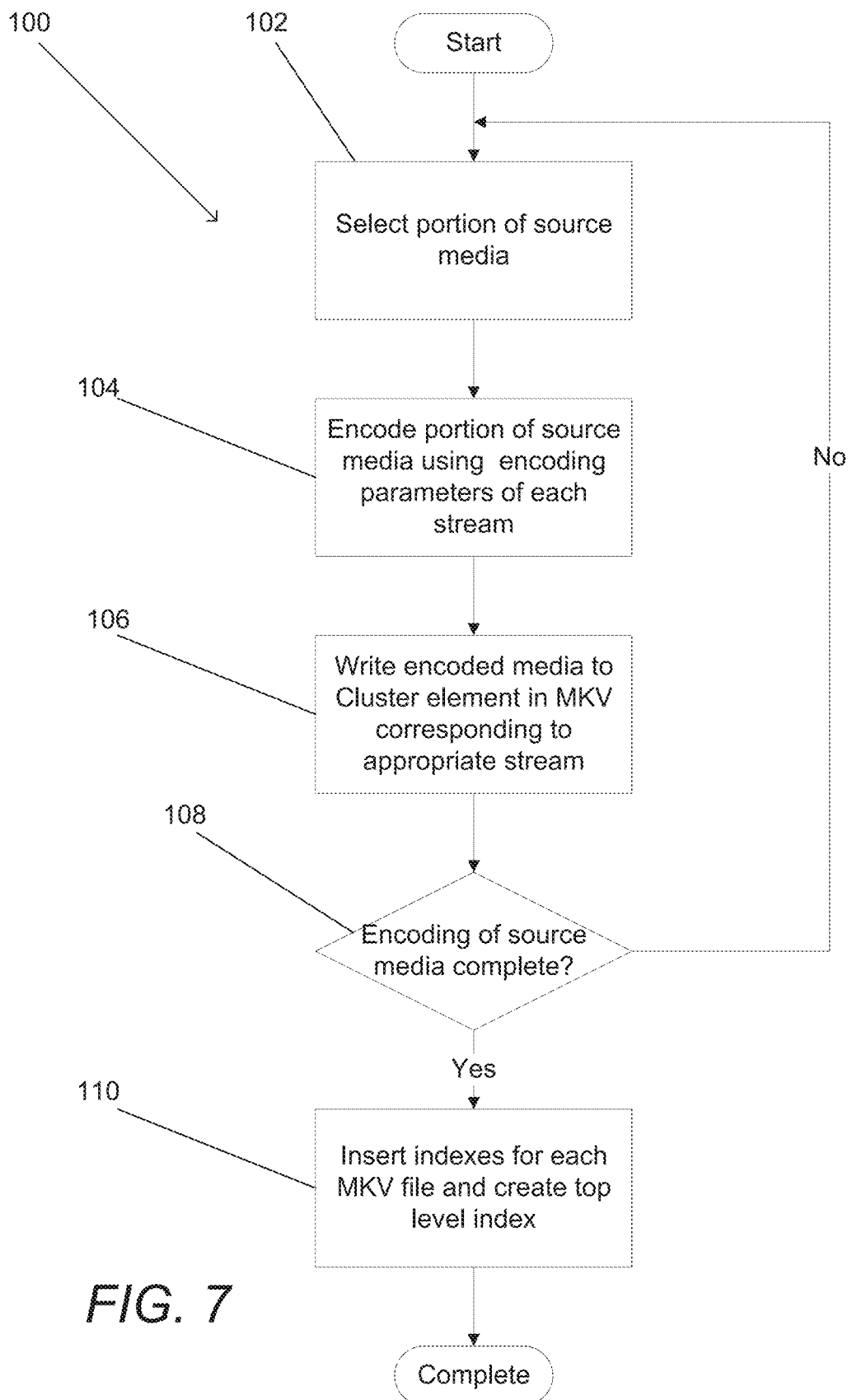
FIG. 7 is a flow chart illustrating a process for encoding source media for adaptive bitrate streaming in accordance with an embodiment of the invention.

A process for encoding source media as a top level index file and a plurality of Matroska container files for use in an adaptive bitrate streaming system in accordance with an embodiment of the invention is illustrated in FIG. 7. The encoding process 100 commences by selecting (102) a first portion of the source media and encoding (104) the source media using the encoding parameters for each stream. When the portion of media is video, then the portion of source video is encoded as a single GOP commencing with an IDR frame. In many embodiments, encoding parameters used to create the alternative GOPs vary based upon bitrate, frame rate, encoding parameters and resolution. In this way, the portion of media is encoded as a set of interchangeable alternatives and a playback device can select the alternative most appropriate to the streaming conditions experienced by the playback device. When different resolutions are supported, the encoding of the streams is constrained so that each stream has the same display aspect ratio. A constant display aspect ratio can be achieved across different resolution streams by varying the sample aspect ratio with the resolution of the stream. In many instances, reducing resolution can result in higher quality video compared with higher resolution video encoded at the same bit rate. In many embodiments, the source media is itself encoded and the encoding process (104) involves transcoding or transrating of the encoded source media according to the encoding parameters of each of the alternative streams supported by the adaptive bitrate streaming system.

Once the source media has been encoded as a set of alternative portions of encoded media, each of the alternative portions of encoded media is inserted (106) into a Cluster element within the Matroska container file corresponding to the stream to which the portion of encoded media belongs. In many embodiments, the encoding process also constructs indexes for each Matroska container file as media is inserted into Cluster elements within the container. Therefore, the process 100 can also include creating a CuePoint element that points to the Cluster element inserted within the Matroska container file. The CuePoint element can be held in a buffer until the source media is completely encoded. Although the above process describes encoding each of the alternative portions of encoded media sequentially in a single pass through the source media, many embodiments of the invention involve performing a separate pass through the source media to encode each of the alternative streams.

Referring back to FIG. 7, the process continues to select (102) and encode (104) portions of the source media and then insert (106) the encoded portions of media into the Matroska container file corresponding to the appropriate stream until the entire source media is encoded for adaptive bitrate streaming (108). At which point, the process can insert an index (110) into the Matroska container for each stream and create (112) a top level index file that indexes each of the encoded streams contained within the Matroska container files. As noted above, the indexes can be created as encoded media and inserted into the Matroska container files so that a CuePoint element indexes each Cluster element within the Mastroska container file. Upon completion of the encoding, each of the CuePoint elements can be included in a Cues element and the Cues element can be inserted into the Matroska container file following the Clusters element.

Following the encoding of the source media to create Matroska container files containing each of the streams generated during the encoding process, which can include the generation of trick play streams, and a top level index file that indexes each of the streams within the Matroska container files, the top level index file and the Matroska container files can be uploaded to an HTTP server for adaptive bitrate streaming to playback devices. The adaptive bitrate streaming of media encoded in accordance with embodiments of the invention using HTTP requests is discussed further below.

Adaptive Bitrate Streaming from MKV Container Files Using HTTP

When source media is encoded so that there are alternative streams contained in separate Matroska container files for at least one of video, audio, and subtitle content, adaptive streaming of the media contained within the Matroska container files can be achieved using HTTP requests or a similar stateless data transfer protocol. In many embodiments, a playback device requests the top level index file resident on the server and uses the index information to identify the streams that are available to the playback device. The playback device can then retrieve the indexes for one or more of the Matroska files and can use the indexes to request media from one or more of the streams contained within the Matroska container files using HTTP requests or using a similar stateless protocol. As noted above, many embodiments of the invention implement the indexes for each of the Matroska container files using a modified Cues element. In a number of embodiments, however, the encoded media for each stream is contained within a standard Matroska container file and separate index file(s) can also be provided for each of the container files. Based upon the streaming conditions experienced by the playback device, the playback device can select media from alternative streams encoded at different bitrates. When the media from each of the streams is inserted into the Matroska container file in the manner outlined above, transitions between streams can occur upon the completion of playback of media within a Cluster element. Therefore, the size of the Cluster elements (i.e the duration of the encoded media within the Cluster elements) is typically chosen so that the playback device is able to respond quickly enough to changing streaming conditions and to instructions from the user that involve utilization of a trick play track. The smaller the Cluster elements (i.e. the smaller the duration of the encoded media within each Cluster element), the higher the overhead associated with requesting each Cluster element. Therefore, a tradeoff exists between the responsiveness of the playback device to changes in streaming conditions and the effective data rate of the adaptive streaming system for a given set of streaming conditions (i.e. the portion of the available bandwidth actually utilized to transmit encoded media). In many embodiments, the size of the Cluster elements is chosen so that each Cluster element contains two seconds of encoded media. In other embodiments, the duration of the encoded media can be greater or less than two seconds and/or the duration of the encoded media can vary from Cluster element to Cluster element.

Figure 8:
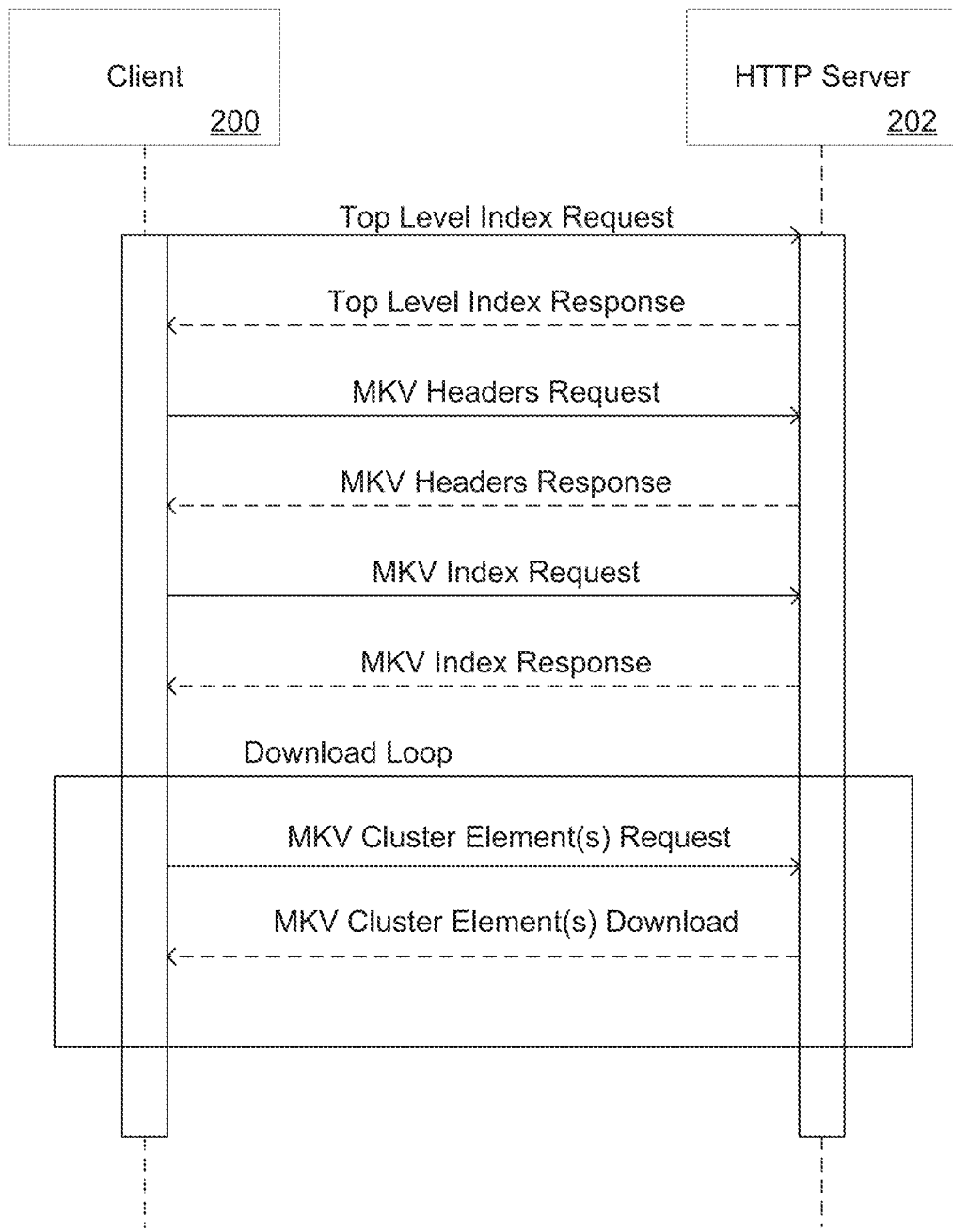
FIG. 8 conceptually illustrates communication between a playback device and an HTTP server associated with the commencement of streaming of encoded media contained within Matroska container files indexed by a top level index file in accordance with an embodiment of the invention.

Communication between a playback device or client and an HTTP server during the playback of media encoded in separate streams contained within Matroska container files indexed by a top level index file in accordance with an embodiment of the invention is illustrated in FIG. 8. In the illustrated embodiment, the playback device 200 commences playback by requesting the top level index file from the server 202 using an HTTP request or a similar protocol for retrieving data. The server 202 provides the bytes corresponding to the request. The playback device 200 then parses the top level index file to identify the URIs of each of the Matroska container files containing the streams of encoded media derived from a specific piece of source media. The playback device can then request the byte ranges corresponding to headers of one or more of the Matroska container files via HTTP or a similar protocol, where the byte ranges are determined using the information contained in the URI for the relevant Matroska container files (see discussion above). The server returns the following information in response to a request for the byte range containing the headers of a Matroska container file:

ELEM("EBML")
ELEM("SEEKHEAD")
ELEM("SEGMENTINFO")
ELEM("TRACKS")

The EBML element is typically processed by the playback device to ensure that the file version is supported. The SeekHead element is parsed to find the location of the Matroska index elements and the SegmentInfo element contains two key elements utilized in playback: TimecodeScale and Duration. The TimecodeScale specifies the timecode scale for all timecodes within the Segment of the Matroska container file and the Duration specifies the duration of the Segment based upon the TimecodeScale. The Tracks element contains the information used by the playback device to decode the encoded media contained within the Clusters element of the Matroska file. As noted above, adaptive bitrate streaming systems in accordance with embodiments of the invention can support different streams encoded using different encoding parameters including but not limited to frame rate, and resolution. Therefore, the playback device can use the information contained within the Matroska container file's headers to configure the decoder every time a transition is made between encoded streams.

In many embodiments, the playback device does not retrieve the headers for all of the Matroska container files indexed in the top level index file. Instead, the playback device determines the stream(s) that will be utilized to initially commence playback and requests the headers from the corresponding Matroska container files. Depending upon the structure of the URIs contained within the top level index file, the playback device can either use information from the URIs or information from the headers of the Matroska container files to request byte ranges from the server that contain at least a portion of the index from relevant Matroska container files. The byte ranges can correspond to the entire index. The server provides the relevant byte ranges containing the index information to the playback device, and the playback device can use the index information to request the byte ranges of Cluster elements containing encoded media using this information. When the Cluster elements are received, the playback device can extract encoded media from the Block elements within the Cluster element, and can decode and playback the media within the Block elements in accordance with their associated Timecode attributes.

In the illustrated embodiment, the playback device 200 requests sufficient index information from the HTTP server prior to the commencement of playback that the playback device can stream the entirety of each of the selected streams using the index information. In other embodiments, the playback device continuously retrieves index information as media is played back. In several embodiments, all of the index information for the lowest bitrate steam is requested prior to playback so that the index information for the lowest bitrate stream is available to the playback device in the event that streaming conditions deteriorate rapidly during playback.

Switching Between Streams

The communications illustrated in FIG. 8 assume that the playback device continues to request media from the same streams (i.e. Matroska container files) throughout playback of the media. In reality, the streaming conditions experienced by the playback device are likely to change during the playback of the streaming media and the playback device can request media from alternative streams (i.e. different Matroska container files) to provide the best picture quality for the streaming conditions experienced by the playback device. In addition, the playback device may switch streams in order to perform a trick play function that utilizes a trick play track stream.

Figure 9A:
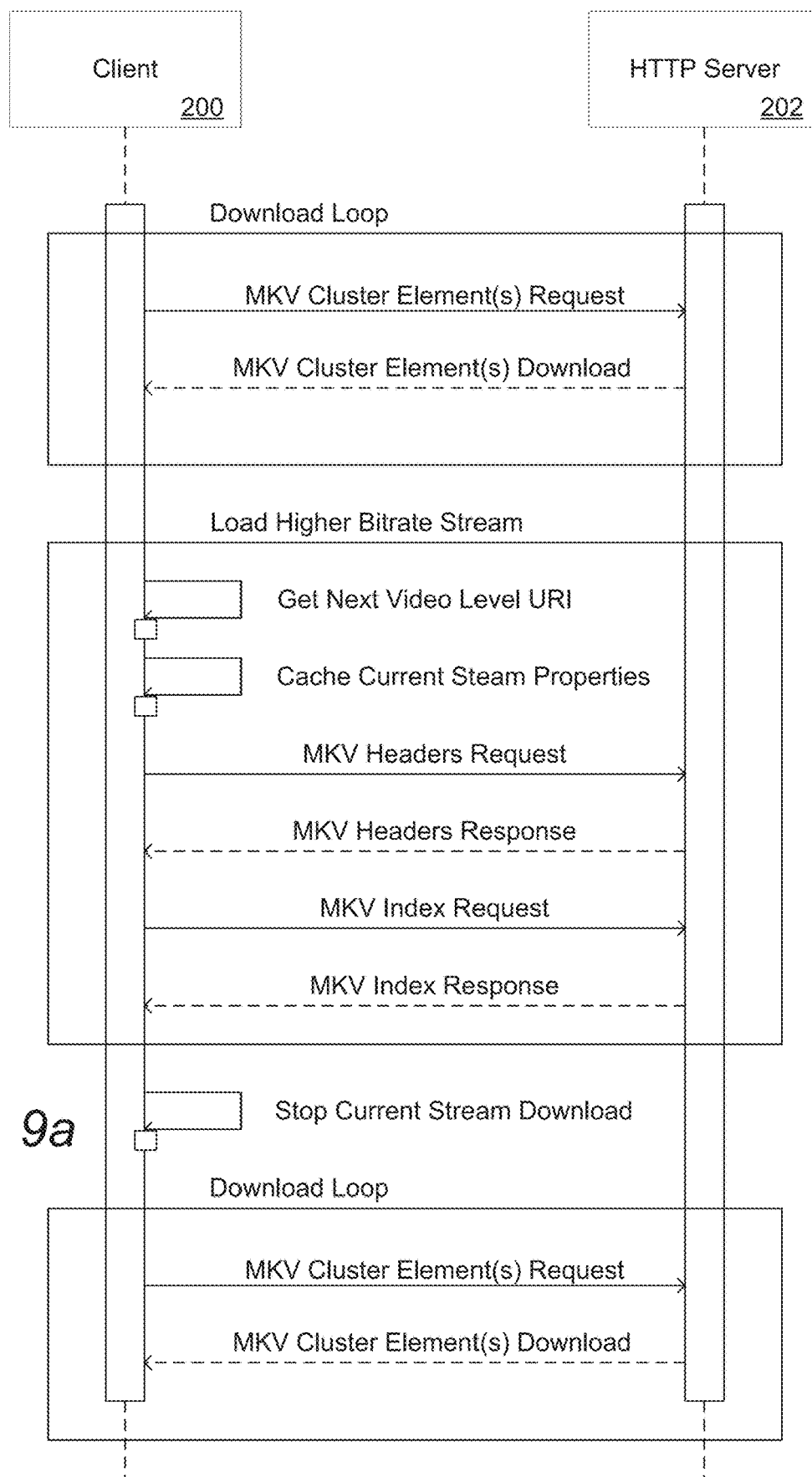
FIGS. 9a and 9b conceptually illustrate communication between a playback device and an HTTP server associated with switching between streams in response to the streaming conditions experienced by the playback device and depending upon the index information available to the playback device prior to the decision to switch streams in accordance with embodiments of the invention.

Communication between a playback device and a server when a playback device switches to a new stream in accordance with embodiments of the invention are illustrated in FIG. 9a. The communications illustrated in FIG. 9a assume that the index information for the new stream has not been previously requested by the playback device and that downloading of Cluster elements from the old stream proceeds while information is obtained concerning the Matroska container file containing the new stream. When the playback device 200 detects a change in streaming conditions, determines that a higher bitrate stream can be utilized at the present streaming conditions, or receives a trick play instruction from a user, the playback device can use the top level index file to identify the URI for a more appropriate alternative stream to at least one of the video, audio, or subtitle streams from which the playback device is currently requesting encoded media. The playback device can save the information concerning the current stream(s) and can request the byte ranges of the headers for the Matroska container file(s) containing the new stream(s) using the parameters of the corresponding URIs. Caching the information in this way can be beneficial when the playback device attempts to adapt the bitrate of the stream downward. When the playback device experiences a reduction in available bandwidth, the playback device ideally will quickly switch to a lower bitrate stream. Due to the reduced bandwidth experienced by the playback device, the playback device is unlikely to have additional bandwidth to request header and index information. Ideally, the playback device utilizes all available bandwidth to download already requested higher rate Cluster elements and uses locally cached index information to start requesting Cluster elements from Matroska container file(s) containing lower bitrate stream(s).

Byte ranges for index information for the Matroska container file(s) containing the new stream(s) can be requested from the HTTP server 202 in a manner similar to that outlined above with respect to FIG. 8. At which point, the playback device can stop downloading of cluster elements from the previous streams and can commence requesting the byte ranges of the appropriate Cluster elements from the Matroska container file(s) containing the new stream(s) from the HTTP server, using the index information from the Matroska container file(s) to identify the Cluster element(s) containing the encoded media following the encoded media in the last Cluster element retrieved by the playback device. As noted above, the smooth transition from one stream to another is facilitated by encoding each of the alternative streams so that corresponding Cluster elements start with the same Timecode element and an IDR frame.

Figure 9B:
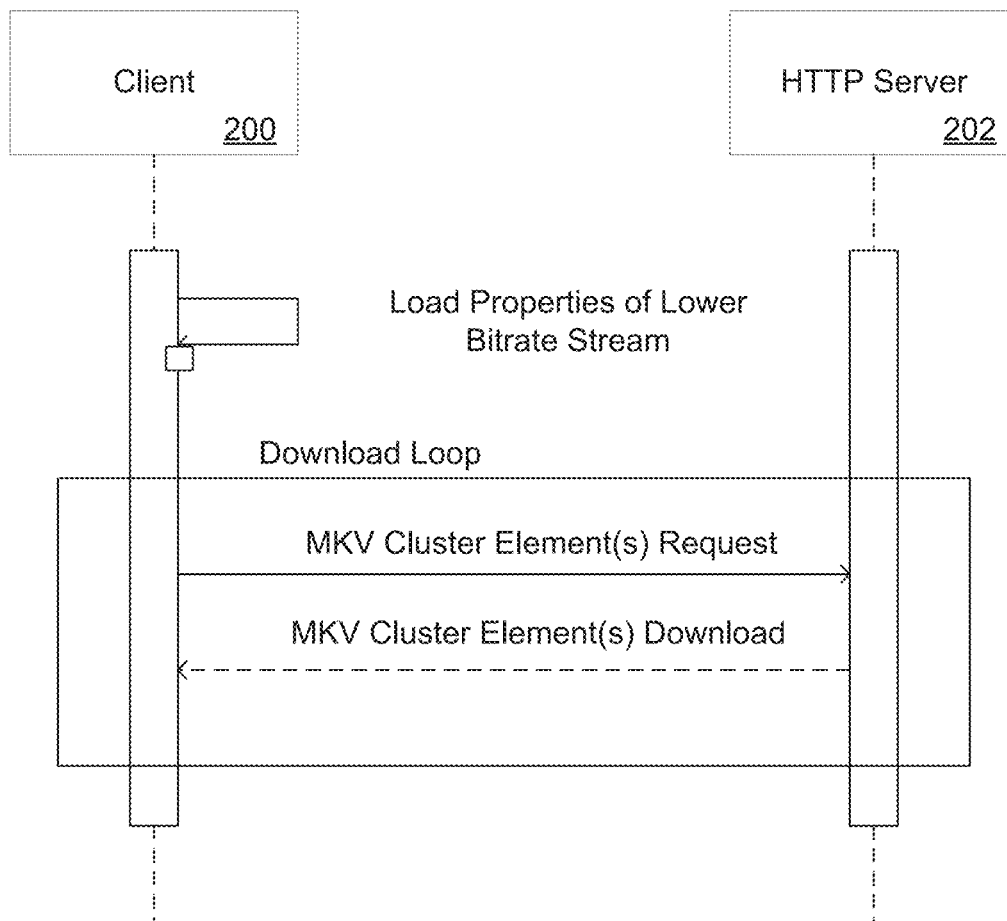

When the playback device caches the header and the entire index for each stream that has be utilized in the playback of the media, the process of switching back to a previously used stream can be simplified. The playback device already has the header and index information for the Matroska file containing the previously utilized stream and the playback device can simply use this information to start requesting Cluster elements from the Matroska container file of the previously utilized stream via HTTP. Communication between a playback device and an HTTP server when switching back to a stream(s) for which the playback device has cached header and index information in accordance with an embodiment of the invention is illustrated in FIG. 9b. The process illustrated in FIG. 9b is ideally performed when adapting bitrate downwards, because a reduction in available resources can be exacerbated by a need to download index information in addition to media. The likelihood of interruption to playback is reduced by increasing the speed with which the playback device can switch between streams and reducing the amount of overhead data downloaded to achieve the switch.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed:

1. A playback device configured to perform adaptive bitrate streaming, the playback device comprising a processor configured, via a client application, to request a top level index file and container files via a network;
   wherein the client application further configures the processor to:
   commence playback by retrieving at least a portion of the top level index file that identifies a plurality of container files that contain the streams available to the playback device for use in adaptive bitrate streaming, where:
   the available streams include a plurality of alternative video streams, each or a group of the alternative video streams is the same source video content encoded at a different bitrate and is stored in a separate container file as a plurality of portions of video, and each container file includes information concerning the encoding of the video contained within the container file and an index to the encoded media within the container file and the at least a portion of the top level index file indicates the portions of each container file containing this information;

select one or more streams including one of the plurality of alternative video streams to utilize in the playback of media based upon the retrieved at least a portion of the top level index file;

using the at least a portion of the top level index file to request the portions of the container file that include the information concerning the encoding of the video contained within the container file and the index to the encoded media within the container file;

configure a video decoder to playback the encoded video using the retrieved information concerning the encoding of the video;

retrieve encoded media from the container file of the selected alternative video stream using the requested index information to the encoded media within the container file;

playback the retrieved portions of video from the selected alternative video stream using the decoder; and when a change in streaming conditions is detected, select a new alternative video stream that is more appropriate for the streaming conditions than the previously selected alternative video stream.

2. The playback device of claim 1, wherein the retrieved portion of the container file of the selected alternative video stream that contains the index to the encoded media within the container file includes sufficient index information to stream the entirety of the selected alternative stream of video.

3. The playback device of claim 1, wherein the client application further configures the processor to request all of the index information for the lowest bitrate stream from the plurality of alternative video streams prior to the commencement of playback.

4. The playback device of claim 1, wherein at least one of the streams available for playback is a trick play track stream encoded at a lower frame rate than the frame rates of the plurality of alternative video streams and the playback device performs a trick play function using the trick play track stream.

5. The playback device of claim 1, wherein the playback device supports different rates of accelerated visual search.

6. The playback device of claim 1, wherein the encoding parameters utilized to decode the encoded video include at least one encoding parameter selected from the group consisting of frame rate, frame height, frame width, sample aspect ratio, maximum bitrate, and minimum buffer size.

7. The playback device of claim 1, wherein the playback device requests at least a portion of the top level index file and container files via the network using a stateless protocol.

8. The playback device of claim 1, wherein the plurality of alternative video streams are encoded with different resolutions and/or different frame rates.

9. The playback device of claim 1, wherein the top level index file is an XML file.

10. The playback device of claim 9, wherein the XML file comprises a list of URIs describing each of the streams and the container files that contain the streams.

11. The playback device of claim 9, wherein the XML file comprises a "header-request" element that specifies the size of the header section of a container file containing a stream.

12. The playback device of claim 1, wherein the container files are Matroska container files, wherein preferably each Matroska container file contains a single stream.

13. The playback device of claim 1, wherein at least two of the alternative streams of encoded video are encoded at the same display aspect ratio, but with different resolutions using different sample aspect ratios.

* * * * *